(12) United States Patent
Swierk et al.

(10) Patent No.: US 11,838,684 B2
(45) Date of Patent: Dec. 5, 2023

(54) SYSTEM AND METHOD FOR OPERATING AN INTELLIGENT VIDEOFRAME PRIVACY MONITORING MANAGEMENT SYSTEM FOR VIDEOCONFERENCING APPLICATIONS

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 123 days.

(21) Appl. No.: 17/159,064

(22) Filed: Jan. 26, 2021

(65) Prior Publication Data

US 2022/0239848 A1 Jul. 28, 2022

(51) Int. Cl.
*H04N 7/14* (2006.01)
*H04N 5/272* (2006.01)
(Continued)

(52) U.S. Cl.
CPC ............. *H04N 7/147* (2013.01); *G06N 3/08* (2013.01); *G06T 5/002* (2013.01); *H04N 5/2621* (2013.01); *H04N 5/272* (2013.01); *H04N 7/152* (2013.01)

(58) Field of Classification Search
CPC ...... H04N 5/272; H04N 7/147; H04N 5/2621; H04N 7/152; G06T 7/194; G06V 40/161; G06V 10/82
See application file for complete search history.

(56) References Cited

U.S. PATENT DOCUMENTS 6,590,601 B2 * 7/2003 Sukeno .................. H04N 7/147
348/14.07
6,640,145 B2 10/2003 Hoffberg
(Continued)

FOREIGN PATENT DOCUMENTS

| CN | 104982029 A | * 10/2015 | ............. G06T 5/002 |
| EP | 3300045 A1 | 3/2018 | |
| JP | H09224228 A | * 8/1997 | |

OTHER PUBLICATIONS

Wang, C; "What's the Difference Between Haar-Feature Classfiers and Convolutional Neural Networks"; Towards Data Science; Aug. 4, 2018 ; <https://towardsdatascience.com/whats-the-difference-between-haar-feature-classifiers-and-convolutional-neural-networks-ce6828343aeb>; accessed Sep. 19 , 2022 (Year: 2018)*

*Primary Examiner* — Xi Wang
(74) *Attorney, Agent, or Firm* — Prol Intellectual Property Law, PLLC; H. Kenneth Prol

(57) ABSTRACT

A system or method executing an intelligent videoframe privacy monitoring management system comprising a processor to execute code instructions of a multimedia multi-user collaboration application to join a videoconference session, a display screen, a speaker, a video camera, and a microphone where the video camera captures a videoframe of a user or background to be transmitted in the videoconference session and the processor to determine from input videoframe data and the detected sensor distance data of the user or the objects or inputting these into the intelligent videoframe privacy monitoring management system to generate optimized videoframe privacy adjustments to apply a privacy alteration to captured videoframes when the user is detected as absent, other faces, or background movement is detected.

20 Claims, 8 Drawing Sheets

(51) Int. Cl.
*H04N 5/262* (2006.01)
*G06T 5/00* (2006.01)
*G06N 3/08* (2023.01)
*H04N 7/15* (2006.01)

(56) References Cited

U.S. PATENT DOCUMENTS

| | | | | |
|---|---|---|---|---|
| 6,674,458 B1 * | 1/2004 | Cohen-Solal | .......... | H04N 7/147 348/E7.086 |
| 7,227,567 B1 * | 6/2007 | Beck | ...................... | H04N 7/147 348/14.07 |
| 7,564,476 B1 * | 7/2009 | Coughlan | .............. | H04N 7/147 348/14.08 |
| 7,657,171 B2 * | 2/2010 | Sundstrom | ............ | G03B 13/30 348/348 |
| 7,720,283 B2 * | 5/2010 | Sun | ........................... | G06T 7/11 382/173 |
| 7,783,075 B2 * | 8/2010 | Zhang | ................... | H04N 7/147 382/173 |
| 7,911,513 B2 * | 3/2011 | Garrison | .................. | H04N 7/14 348/239 |
| 8,305,448 B2 * | 11/2012 | Yoda | .................. | H04N 5/23219 348/211.1 |
| 8,355,039 B2 * | 1/2013 | Michrowski | ........... | H04N 7/147 709/204 |
| 8,363,085 B2 * | 1/2013 | Michrowski | ....... | H04N 5/23235 709/204 |
| 8,462,191 B2 * | 6/2013 | DeGrazia | ............... | H04N 7/147 348/14.09 |
| 8,723,912 B2 * | 5/2014 | Michrowski | ....... | H04N 5/23235 709/204 |
| 8,903,521 B2 | 12/2014 | Goree | | |
| 8,913,056 B2 | 12/2014 | Zimmer | | |
| 8,982,179 B2 * | 3/2015 | North | ................. | H04N 21/8146 348/14.14 |
| 9,041,765 B2 | 5/2015 | Periyannan | | |
| 9,083,850 B1 * | 7/2015 | Higgs | .................... | H04N 7/147 |
| 9,124,762 B2 | 9/2015 | Cutler | | |
| 9,158,904 B1 | 10/2015 | Ross | | |
| 9,232,189 B2 * | 1/2016 | Shaburov | ............. | H04L 65/403 |
| 9,282,285 B2 * | 3/2016 | Winterstein | ........... | H04N 7/141 |
| 9,313,454 B2 | 4/2016 | Alonde | | |
| 9,357,165 B2 * | 5/2016 | Lu | ........................... | G06T 11/60 |
| 9,369,669 B2 * | 6/2016 | Liu | ......................... | H04N 7/15 |
| 9,503,685 B2 | 11/2016 | Baron, Jr. | | |
| 9,800,833 B2 * | 10/2017 | Lu | ......................... | H04N 7/15 |
| 9,866,827 B2 | 1/2018 | Bose | | |
| 9,876,964 B2 * | 1/2018 | Zhou | ................... | H04N 19/167 |
| 9,881,359 B2 * | 1/2018 | Liu | ......................... | H04N 7/15 |
| 9,883,144 B2 * | 1/2018 | Marlow | ................ | H04N 7/157 |
| 9,911,193 B2 * | 3/2018 | Eliraz-Levonai | ....... | G06T 7/246 |
| 9,928,874 B2 * | 3/2018 | Shaburova | ............ | G06T 19/20 |
| 9,948,893 B2 * | 4/2018 | Barzuza | ................ | H04L 65/403 |
| 9,992,450 B1 * | 6/2018 | Yuan | ................... | G06F 18/2321 |
| 10,116,901 B2 * | 10/2018 | Shaburov | ............ | G06V 40/161 |
| 10,181,178 B2 * | 1/2019 | Cutler | ...................... | G06T 7/11 |
| 10,419,721 B2 * | 9/2019 | Lu | ......................... | G06V 40/166 |
| 10,440,324 B1 * | 10/2019 | Lichtenberg | ........ | H04L 65/1104 |
| 10,553,002 B2 | 2/2020 | Armstrong-Muntner | | |
| 10,719,919 B1 * | 7/2020 | Kosugi | ................... | G06F 21/32 |
| 10,776,073 B2 * | 9/2020 | Lenke | ..................... | H04N 7/15 |
| 10,785,421 B2 * | 9/2020 | Denoue | ................ | G06V 40/172 |
| 10,789,685 B2 * | 9/2020 | Cutler | ....................... | G06T 7/11 |
| 10,819,950 B1 * | 10/2020 | Lichtenberg | ........ | H04L 65/1069 |
| 11,044,442 B2 * | 6/2021 | Lu | ............................. | G06T 7/10 |
| 11,182,879 B1 * | 11/2021 | Haslam | ................ | G06V 40/172 |
| 11,190,735 B1 * | 11/2021 | Trim | ...................... | G06V 20/52 |
| 11,252,374 B1 * | 2/2022 | Lichtenberg | ........ | H04L 12/1827 |
| 11,303,465 B2 * | 4/2022 | Trim | ...................... | H04L 12/1831 |
| 11,323,659 B2 * | 5/2022 | Ahn | ......................... | G06N 3/04 |
| 11,343,445 B2 * | 5/2022 | Denoue | ................ | H04N 5/2224 |
| 11,343,446 B2 * | 5/2022 | Denoue | ................ | G06V 40/161 |
| 11,386,562 B2 * | 7/2022 | Chiang | .................. | H04N 5/272 |
| 11,392,709 B2 * | 7/2022 | Varerkar | ................ | G08B 13/22 |
| 11,425,335 B2 * | 8/2022 | Lemes da Silva | ..... | G06N 3/088 |
| 2007/0153091 A1 * | 7/2007 | Watlington | ........ | H04N 21/4223 348/208.14 |
| 2012/0051631 A1 * | 3/2012 | Nguyen | ................. | G06T 7/194 382/164 |
| 2012/0147121 A1 * | 6/2012 | Erb | ........................ | H04N 7/144 348/E7.078 |
| 2012/0327172 A1 * | 12/2012 | El-Saban | ................ | G06T 7/174 348/14.02 |
| 2012/0327176 A1 * | 12/2012 | Kee | ......................... | H04N 7/15 348/E7.083 |
| 2014/0176663 A1 * | 6/2014 | Cutler | .............. | H04N 5/232127 348/14.07 |
| 2014/0368604 A1 * | 12/2014 | Lalonde | ................ | G06V 40/16 348/14.08 |
| 2017/0148487 A1 * | 5/2017 | Krishnakumar | .......... | G06T 7/10 |
| 2017/0332044 A1 * | 11/2017 | Marlow | ................ | G06V 20/46 |
| 2018/0088776 A1 | 3/2018 | Motta | | |
| 2019/0034706 A1 * | 1/2019 | el Kaliouby | ....... | H04N 21/4223 |
| 2019/0042871 A1 * | 2/2019 | Pogorelik | ................ | G06T 7/10 |
| 2019/0147175 A1 * | 5/2019 | Varerkar | ................ | H04L 63/101 726/26 |
| 2019/0172238 A1 * | 6/2019 | Miao | ................... | G06V 30/194 |
| 2020/0053257 A1 * | 2/2020 | Sreepathihalli | ......... | G06T 7/136 |
| 2020/0133374 A1 * | 4/2020 | Sinha | .................... | G06F 1/3287 |
| 2020/0142471 A1 * | 5/2020 | Azam | ................... | G06F 1/3265 |
| 2021/0099672 A1 * | 4/2021 | Ahn | ...................... | H04N 7/147 |
| 2021/0109486 A1 * | 4/2021 | Hamlin | ................ | G01S 17/04 |
| 2022/0036708 A1 * | 2/2022 | Rey | ...................... | G06F 21/6245 |
| 2022/0239848 A1 * | 7/2022 | Swierk | .................... | G06T 5/002 |
| 2022/0335945 A1 * | 10/2022 | Madar, III | ............ | H04W 12/60 |
| 2022/0350925 A1 * | 11/2022 | Alexander | ............ | G06N 20/00 |

* cited by examiner

SYSTEM AND METHOD FOR OPERATING AN INTELLIGENT VIDEOFRAME PRIVACY MONITORING MANAGEMENT SYSTEM FOR VIDEOCONFERENCING APPLICATIONS

FIELD OF THE DISCLOSURE

The present disclosure generally relates to multimedia, multi-user collaboration applications, such as videoconferencing applications. More specifically, the present disclosure relates to intelligently managing media processing pursuant to execution of such applications, based on sensor and context factors for the appearance of a user related to a current user videoconference session within such an application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
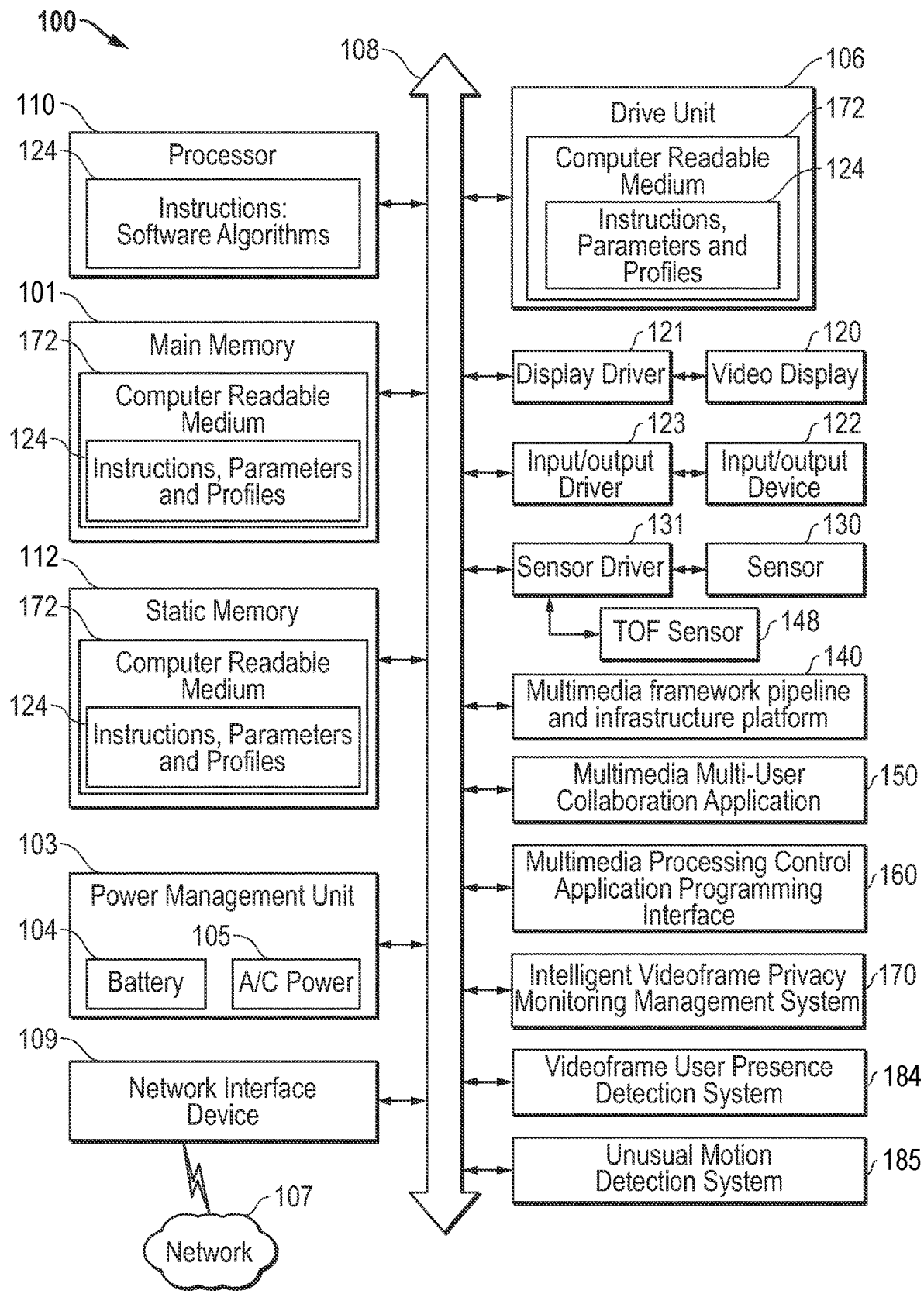
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include any number of people, but sometimes exceeds 50 or 100 participants. In many cases, as workers increasingly work from home, tools such as multimedia multi-user collaboration applications (MMCAs) are used to conduct videoconference meetings and collaborations on documents or projects among workers, with customers or clients, or even in casual settings among friends and family. With busy schedules that may include many online meetings or interspersed formal/business and casual or videoconference meetings while working from home, distractions may occur during various online videoconferences or collaboration sessions. For example, a user may leave the video conference running while getting up to address a matter away from the information handling system such as to get a cup of coffee or speak to someone in another room. In another example, the user may have other people, such as children, or pets who may run into the background while a videoconference session is ongoing that may cause distraction. Existing multimedia multi-user collaboration applications hosting such video conferences perform the same video processing methods on videos of each participant without accounting for the potential distraction concerns that may be important to a user of an MMCA. Such processing of videoframes may occur both at each individual participant's computing device, and be transmitted to all other participant's computing devices of all other participants which may cause embarrassment. Accordingly, it may be desirable for privacy when distractions occur during participation in a videoconference session without having to remember to turn off the video camera system or microphone.

The intelligent videoframe privacy monitoring management system in embodiments of the present disclosure addresses these privacy issues identifying one or more video frame interruptions based on sensor distance data of a user, other persons or objects, or other background elements in front of a video camera system. The intelligent videoframe privacy monitoring management system in embodiments herein determines one or more optimized videoframe privacy adjustments (or audio capture adjustment) for a variety of videoconference interruptions detected. Additionally, the optimized videoframe privacy adjustments may depend on multimedia multi-user collaboration application performance environments encountered by the information handling system participating in user videoconference sessions or the contextual meeting metrics of the casual versus professional/formal nature of the videoconference sessions.

In some embodiments of the present disclosure, the detection of videoconference interruptions may be conducted without a neural network by the intelligent videoframe privacy monitoring management system software. In those embodiments, the intelligent videoframe privacy monitoring management system may determine certain videoconference interruption events based on proximity sensor data and determination of distances of a user, other persons or objects, or background elements in front of a video camera system during videoframe capture. Additionally, the proximity sensor data may be used with a user presence detection (UPD) software system to detect absence or presence of a user or detect plural faces present in some embodiments. In other embodiments, an unusual motion detection (UMD) software system may be executed to assess multiple videoframes with proximity sensor distance data to detect motion such as background motion in captured videoframes.

However, other embodiments of the present disclosure also contemplate utilization of training a neural network to determine videoconference interruption events, and that determination may include added context in some aspects as described herein. For example, a neural network may be trained to use proximity distance data detected with a face recognition neural network to detect user absence or presence as well as identify the user as being the one present or absence. For example, a user may leave a videoconference, and then someone returns to their screen. Similarly, the neural network may be trained to use facial recognition or other inputs for context of detected plural faces. For example, identification of invited participants to a videoconference may determine if a videoconference is casual and, thus, no privacy alterations to videoframes are necessary with plural faces detected. It may be that having plural faces participate in the videoconference session may be desired in a casual setting. Additionally, if privacy alterations are desired, a neural network may be trained to identify faces and their identity to determine if the alterations should be applied or where to apply a blur or other alteration. Thus, the intelligent videoframe privacy monitoring management system may output optimized videoframe privacy adjustments based on processing proximity sensor distance data, on output from a trained neural network, or on a combination in various embodiments.

In embodiments described herein, the term "media" may refer to images, videoframes, or video samples (e.g., compilation of several images over time) captured by a camera, audio samples captured by a microphone, or a combination of audio and video samples to form a media sample providing both audio and video as audio-visual (AV) data. A separate neural network may be trained for each of a plurality of information handling systems in embodiments, based on the image of the user, desired intelligent videoframe privacy monitoring selected by the user, performance metrics or functional capabilities unique to that information handling system. Such neural networks may operate at a transmitting information handling system that captures and transmits audio and video of a participant of the user videoconference session, or at a remote information handling system that receives and processes the audio and video of the participant for facilitating transmission of image videoframe streams for a videoconferencing session. Optimized settings determined by such neural networks in embodiments may also operate to decrease the processing burden placed on the CPU, GPU, or other processors and controllers (and undesirable side effects associated therewith) at either or both the transmitting information handling system and the receiving information handling system in some embodiments when executing optimized videoframe privacy adjustments.

The one or more optimized videoframe privacy adjustments generated in response to a videoconference interruption by an intelligent videoframe privacy monitoring management system neural network may include privacy alterations made to videoframes to be transmitted such as to apply a virtual background when one is not currently operating, to blur a portion or all of the videoframes, or to replace the user's image with a stock image, such as a stock photo of the user or an enterprise logo during some or all of the videoconferencing session. Other privacy alterations that may be applied in response to a videoconference interruption include audio capture adjustments such as muting a microphone. In one or more aspects, the intelligent videoframe privacy monitoring management system may be invoked with any MMCA and options for intelligent appearance monitoring may be presented to a user via a user interface. For example, the user interface may allow for enabling or disabling the intelligent videoframe privacy monitoring management system. Further, the user interface may present options for customizing types of videoconference interruptions to be detected by the intelligent videoframe privacy monitoring management system or customizing types of privacy alterations to be applied in response in some embodiments.

The intelligent videoframe privacy monitoring management system, or portions thereof, may operate remotely from the information handling system for which the neural network is trained in some embodiments. For example, the intelligent videoframe privacy monitoring management system may operate as part of an information handling system performance optimizer application as a software service to users hosted, for example, by the manufacturer of the information handling system, or managed by the information handling system user's employer or Information Technology (IT) manager. Such an information handling system performance optimizer application may also operate in example embodiments in various contexts to monitor certain performance metrics at the information handling system, perform firmware and software updates, confirm security credentials and compliance, and manage user access across a plurality of information handling systems (e.g., as owned by an employer or enterprise corporation). In such embodiments, the intelligent videoframe privacy monitoring management system may receive such performance metrics and metrics describing previous multimedia multi-user collaboration application user videoconference sessions for an information handling system via any type of network, including out-of-band communications such as data inputs relating to identification of interruptions such as a user's presence or absence or other persons or movement in a user's background, and communications with one or more software applications, application programming interfaces (APIs), or directly with one or more controllers or firmware in kernel mode. In other embodiments, some or all of the intelligent videoframe privacy monitoring management system may operate locally to a user or videoconference participant's information handling system.

The intelligent videoframe privacy monitoring management system may apply one or more privacy alterations to videoframes for transmission via execution of AV processing instruction modules used to post-process videoframes captured by the video camera system for the videoconference session. Those privacy alterations to videoframes may be correlated to the detected videoconference interruptions by a trained neural network or may correspond to user selections. Upon processing of media samples, a multimedia framework pipeline and infrastructure platform may transmit the processed, encoded media sample that includes video of the transmitting information handling system, to the multimedia multi-user collaboration application for the transmission. The processed, encoded media sample may then be transmitted to other information handling systems (e.g., receiving information handling systems) in use by other participants within the current videoconferencing session for the multimedia multi-user collaboration application. These receiving information handling systems may then reprocess and decode the received media sample, for playback at the displays for these receiving information handling systems. In such a way, the intelligent videoframe privacy monitoring management system may apply privacy alterations as neural network output videoframe privacy adjustments to mask or screen a user's background a videoconference stream of videoframes to decrease or eliminate potential undesirable interruptions from being viewed or noticed during participation in a current user videoconference session for a multimedia multi-user collaboration application.

Turning now to the figures, FIG. 1 illustrates an information handling system 100 similar to information handling systems according to several aspects of the present disclosure. As described herein, the intelligent videoframe privacy monitoring management system 170 in an embodiment may operate to identify videoconference interruptions and to generate optimized videoframe privacy adjustments that may adjust the user's image during the capture, processing, encoding, and transmission of a media sample (e.g., including audio or video) from a transmitting information handling system to a receiving information handling system. The information handling system 100 described with reference to FIG. 1 may represent a transmitting information handling system or a receiving information handling system in various embodiments. In still other embodiments, information handling system 100 may operate as both a transmitting and a receiving information handling system, as may be the case for an information handling system transmitting video of one participant user while simultaneously executing code instructions for the multimedia multi-user collaboration application (MMCA) 150 to display videos of other participants within a shared user videoconference session.

In yet another embodiment, the information handling system 100 may operate remotely from all transmitting or receiving information handling systems executing code instructions of the MMCA 150 to participate within a user videoconference session. For example, the intelligent videoframe privacy monitoring management system 170 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user videoconference session of the MMCA 150 may incorporate an agent or API for the intelligent videoframe privacy monitoring management system 170.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), a vision processing unit (VPU), a Gaussian neural accelerator (GNA), hardware or software control logic, or any combination thereof. Additional components of the information handling system 100 may include one or more storage devices, one or more communications ports for communicating with external devices, as well as various input and output (I/O) devices 122, such as a keyboard, a mouse, a headset device, one or more microphones, one or more speakers, a touchpad, or any combination thereof. The information handling system 100 may also include various sensors 130 (e.g., time of flight (TOF) sensors 148, Hall effect positional sensors, hinge rotation sensors, geographic locations sensors such as GPS systems, light sensors, time of flight sensors, infrared sensors, etc.). A power management unit 103 supplying power to the information handling system 100, via a battery 104 or an alternating current (A/C) power adapter 105 may also be included within information handling system 100, as well as one or more buses operable to transmit communications between the various hardware components. The information handling system 100 may further include a video display 120. The video display 120 in an embodiment may function as a liquid crystal display (LCD), an organic light emitting diode (OLED), a flat panel display, or a solid-state display. Portions of an information handling system 100 may themselves be considered information handling systems 100.

In an example embodiment, the information handling system 100 may include a laptop or desktop system that executes the MMCA 150 that may operate as a videoconferencing application. The MMCA 150 may include any computer code that is executed by a processor 102, or other processors of the information handling system 100 in order to capture, process, and encode of media samples for transmission, or reprocess, decode, or display of received media samples, pursuant to execution of the MMCA 150. The multimedia framework pipeline and infrastructure platform 140 in an embodiment may execute code instructions to direct execution of specific processing and encoding of media samples for transmission when an information handling system 100 serves as a media source, or direct execution of reprocessing, and decoding of received media samples when the information handling system 100 serves as a media sink. The MMCA 150 in an embodiment may transmit to the multimedia framework pipeline and infrastructure platform 140 default settings for such processing, reprocessing, encoding, decoding, capture, and display (e.g., via bus 108). Such default settings may need to be optimized to avoid unnecessarily high processing burden at the information handling system 100.

The intelligent videoframe privacy monitoring management system 170 in an embodiment may be executable code that may operate to determine various types of videoconference interruptions from distance data detection of a user, background or objects before a video camera and from captured videoframes. The intelligent videoframe privacy monitoring management system 170 in an embodiment may generate optimized videoframe privacy adjustments to implement privacy alterations to captured videoframes by implementing various AV processing instruction modules among plural sets of media samples or adjust settings of those AV processing instruction modules.

The intelligent videoframe privacy monitoring management system 170 in an embodiment may include code instructions 124 for training a neural network, or for executing a neural network. In an embodiment in which the intelligent videoframe privacy monitoring management system 170 operates to train a neural network, the information handling system 100 may represent the transmitting information handling system, the receiving information handling system, both of these, or an information handling system located remotely from both the transmitting and receiving information handling systems may conduct training of the neural network such as one operating at an information handling system optimizer. The intelligent videoframe privacy monitoring management system 170 in each of these embodiments may gather various input values such as distance data from sensors and videoframes with images of the user or background, hardware and software settings, and other inputs as described herein from one or more information handling systems executing the MMCA (e.g., 150) in order to determine optimized videoframe privacy adjustments. The intelligent videoframe privacy monitoring management system 170 may provide intelligent videoframe privacy monitoring as a software service to each of users of the one or more information handling systems where intelligent videoframe privacy monitoring service is selected by that user to intelligently monitor videoframe privacy in videoframes captured at each information handling system.

The multimedia processing control API 160 in an embodiment may operate to facilitate communication between various applications, controllers, and drivers of the information handling system 100 in an embodiment. For example, in an embodiment in which the neural network is trained remotely from the information handling system 100 (e.g., the information handling system represents a receiving information handling system or transmitting information handling system), the multimedia processing control API 160 may operate to gather input values for the neural network from the input/output driver 123, sensor driver 131, multimedia framework pipeline and infrastructure platform 140, processor 110, main memory 101, power management unit 103, network interface device 109, or code instructions executing for MMCA 150, a videoframe user presence detection (VPD) system 184, or an unusual motion detection (UMD) system 185 (e.g., via bus 108). The multimedia processing control API 160 in such an embodiment may transmit such gathered inputs to the remotely located system for training the neural network in some embodiments of the present disclosure via network interface device 109 and network 107 in embodiments in which the neural network is trained remotely from the information handling system 100. The trained neural network may then be executed in the same remote location, or may be transmitted to the information handling system 100 via network 107 for storage in main memory 101, static memory 112, or drive unit 106 (e.g., as instructions 124). In an embodiment in which a neural network is trained at the information handling system 100, the multimedia processing control API 160 may transmit the gathered inputs to the intelligent videoframe privacy monitoring management system 170 operating at a remotely-located information handling system 100 (e.g., as instructions 124).

Upon execution of the intelligent videoframe privacy monitoring management system 170 (e.g., as instructions 124), or in some embodiments with execution of an optional trained neural network in various embodiments, and during execution of a user videoconference session via the MMCA 150, the multimedia processing control API 160 may gather current input values such as proximity sensor distance data and captured videoframes. The multimedia processing control API 160 in such an embodiment may transmit such gathered inputs to the intelligent videoframe privacy monitoring management system (or agent) 170.

The intelligent videoframe privacy monitoring management system 170, with or without a trained neural network in various embodiments, may then output optimized videoframe privacy adjustments that may include generating optimized videoframe privacy adjustments to various drivers or AV processing instruction modules via the multimedia processing control API 160 in response to detected user videoconference interruptions. In some embodiments, an optimized media capture instruction may be transmitted (e.g., via bus 108) to the input/output driver 123 in an embodiment in which the input/output device 122 is a camera or microphone. For example, an optimized media capture instruction may mute, turn off or on, or otherwise adjust a microphone or camera. In such an example embodiment, the input/output driver 123 may be a streaming media driver, a camera driver, one of a plurality of camera drivers, or an audio driver for a microphone. As another example, an optimized AV processing instruction adjustment or an optimized offload instruction may be transmitted (e.g., via bus 108) to the input/output driver 123 or to the multimedia framework pipeline and infrastructure platform 140. The intelligent videoframe privacy monitoring management system 170 may perform such operations in an embodiment in which information handling system 100 is a transmitting information handling system, or in which information handling system 100 is a receiving information handling system.

In other embodiments, the captured video samples (or audio samples) may be transmitted to the multimedia framework pipeline and infrastructure platform 140, which may apply one or more AV processing instruction modules to the captured video or audio samples. Application of AV processing instruction modules may be invoked or have settings adjusted by a trained neural network output optimized video frame adjustments. The multimedia framework pipeline and infrastructure platform 140 in such an embodiment may engage the processor 110 (e.g., CPU, GPU, VPU, GNA) identified within the offload instructions to execute such AV processing instruction modules on the captured video or audio samples to generate a processed, encoded media sample combining the video and audio samples. The MMCA 150 may then direct transmission of the processed, encoded media sample to other information handling systems operated by other participants of the user videoconference session for the MMCA 150, via network interface device 109 and network 107.

In an embodiment in which the information handling system 100 represents a media playing and receiving information handling system, the network interface device 109 may receive a processed, encoded media sample from another information handling system operated by another participant of the user videoconference session for the MMCA 150, via network 107. For example, the MMCA 150 may access streaming media samples generated at an information handling system other than information handling system 100 at a Unique Resource Identifier (URI) within network 107, through the network interface device 109 and bus 108. The media samples so received in an embodiment may be transmitted to the multimedia framework pipeline and infrastructure platform 140, which may apply one or more AV processing instruction modules defined by the received optimized AV processing instruction adjustments to the received media sample. The multimedia framework pipeline and infrastructure platform 140 in such an embodiment may engage the processor 110 (e.g., CPU, GPU, VPU, GNA) identified within the offload instructions to execute such AV processing instruction modules on the received media sample to generate a reprocessed, decoded media sample. The MMCA 150 may then direct playback of the reprocessed, decoded media sample via the display driver 121 and the video display 120.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 110 such as a CPU, GPU, VPU, GNA, control logic or some combination of the same. Any of the processing resources may operate to execute code that is either firmware or software code. Specifically, the processor 110 may operate to execute code instructions of firmware for the input/output driver 123, such as part of a streaming media driver, in an embodiment. Moreover, the information handling system 100 may include memory such as main memory 101, static memory 112, or other memory of computer readable medium 172 storing instructions 124 of the intelligent videoframe privacy monitoring management system 170 for optimizing execution of a user videoconference session of the MMCA 150, and drive unit 106 (volatile (e.g., random-access memory, etc.), nonvolatile memory (read-only memory, flash memory etc.) or any combination thereof. A processor 110 may further provide the information handling system with a system clock for which a time of day clock may be tracked along with any location detector such as global positioning system or in coordination with a network interface device 109 connecting to one or more networks 107. The information handling system 100 may also include one or more buses 108 operable to transmit communications between the various hardware components such as any combination of various input and output (I/O) devices 122, sensors 130, TOF sensor 148, or video display 120.

The network interface device (NID) 109 may provide wired or wireless connectivity to a network 107. The network interface device 109 may operate according to any known wired or wireless network protocol understood in the art. For example, the network interface device may operate as a wide area network (WAN), a local area network (LAN), wireless local area network (WLAN), a wireless personal area network (WPAN), a wireless wide area network (WWAN), or other network. The network interface device 109 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 109 may operate two or more wireless links. Network interface device 109 may also connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

The network interface device or NID 109 may operate to establish communication links under wired or wireless protocols enabling MMCA 150 communications for purposes of conducting a videoconference according to embodiments herein. Further, the NID may utilize other communication links under wired or wireless protocols to enable data communications for other operating applications of the information handling system 100. Additionally, the NID may utilize other communication links under wired or wireless protocols to enable data communications out of band and separate from the communication links for the videoconferencing session by the MMCA 150, such as communications to support the MMCA 150 or enable some or all parts of remote operation of the MMCA 150 or the intelligent videoframe privacy monitoring management system 170.

In some embodiments, software, firmware, dedicated hardware implementations such as application specific integrated circuits, programmable logic arrays and other hardware devices may be constructed to implement one or more of some systems and methods described herein. For example, some embodiments may include operation of embedded controllers for various applications or input/output devices 122.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 107 may communicate voice, video or data over the network 107. Further, the instructions 124 may be transmitted or received over the network 107 via the network interface device 109.

The information handling system 100 may include a set of instructions 124 that may be executed to cause the computer system to perform any one or more of the methods or computer-based functions disclosed herein. As an example, instructions 124 may execute an intelligent videoframe privacy monitoring management system 170, software agents, the MA/ICA 140, various APIs such as 160 or the multimedia framework pipeline and infrastructure platform that may provide a framework for the systems, or other aspects or components of the embodiments herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 106 and the intelligent videoframe privacy monitoring management system 170 may include a computer-readable medium 172 in which one or more sets of instructions 124 such as software may be embedded. Similarly, main memory 101 and static memory 112 may also contain a computer-readable medium for storage of one or more sets of instructions, parameters, or profiles 124. The disk drive unit 106 and static memory 112 may also contain space for data storage. Further, the instructions 124 may embody one or more of the methods or logic as described herein. For example, instructions relating to the intelligent videoframe privacy monitoring management system 170, code instructions of a trained neural network, code instructions of the VPD system 184, or the UMD system 185, software algorithms, processes, and/or methods may be stored here. In a particular embodiment, the instructions, parameters, and profiles 124 may reside completely, or at least partially, within the main memory 101, the static memory 112, and/or within the disk drive 106 during execution by the processor 110 of information handling system 100. As explained, some of or all the intelligent videoframe privacy monitoring management system 170 may be executed locally or remotely. The main memory 101 and the processor 110 also may include computer-readable media.

Main memory 101 may contain computer-readable medium, such as RAM in an example embodiment. An example of main memory 101 includes random access memory (RAM) such as static RAM (SRAM), dynamic RAM (DRAM), non-volatile RAM (NV-RAM), or the like, read only memory (ROM), another type of memory, or a combination thereof. Static memory 112 may contain computer-readable medium (not shown), such as NOR or NAND flash memory in some example embodiments. The intelligent videoframe privacy monitoring management system 170 may be stored in static memory 112, or the drive unit 106 on a computer-readable medium 172 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 103 (a.k.a. a power supply unit (PSU)). The PMU 103 may manage the power provided to the components of the information handling system 100 such as the processor 110 (e.g., CPU, GPU, VPU, GNA, etc.), a cooling system such as a bank of fans, one or more drive units 106, the video/graphic display device 120, and other components that may require power when a power button has been actuated by a user. In an embodiment, the PMU 103 may be electrically coupled to the bus 108 to provide this power. The PMU 103 may regulate power from a power source such as a battery 104 or A/C power adapter 105. In an embodiment, the battery 104 may be charged via the A/C power adapter 105 and provide power the to the components of the information handling system 100 when A/C power from the A/C power adapter 105 is removed.

In an embodiment, the intelligent videoframe privacy monitoring management system 170 may be code instructions and operate with the main memory 101, the processor 110, the multimedia processing control API 160, various embedded controllers and the NID 109 via bus 108, and several forms of communication may be used, including ACPI, SMBus, a 24 MHZ BFSK-coded transmission channel, or shared memory. Driver software, firmware, controllers, and the like may communicate with applications on the information handling system 100.

Driver software, firmware, controllers and the like may communicate with applications on the information handling system 100, for example via the input/output driver 123, which may be a streaming media driver or other drivers for I/O devices, or the sensor driver 131. Similarly, video display driver software, firmware, controllers and the like may communicate with applications on the information handling system 100, for example, via the display driver 121. In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
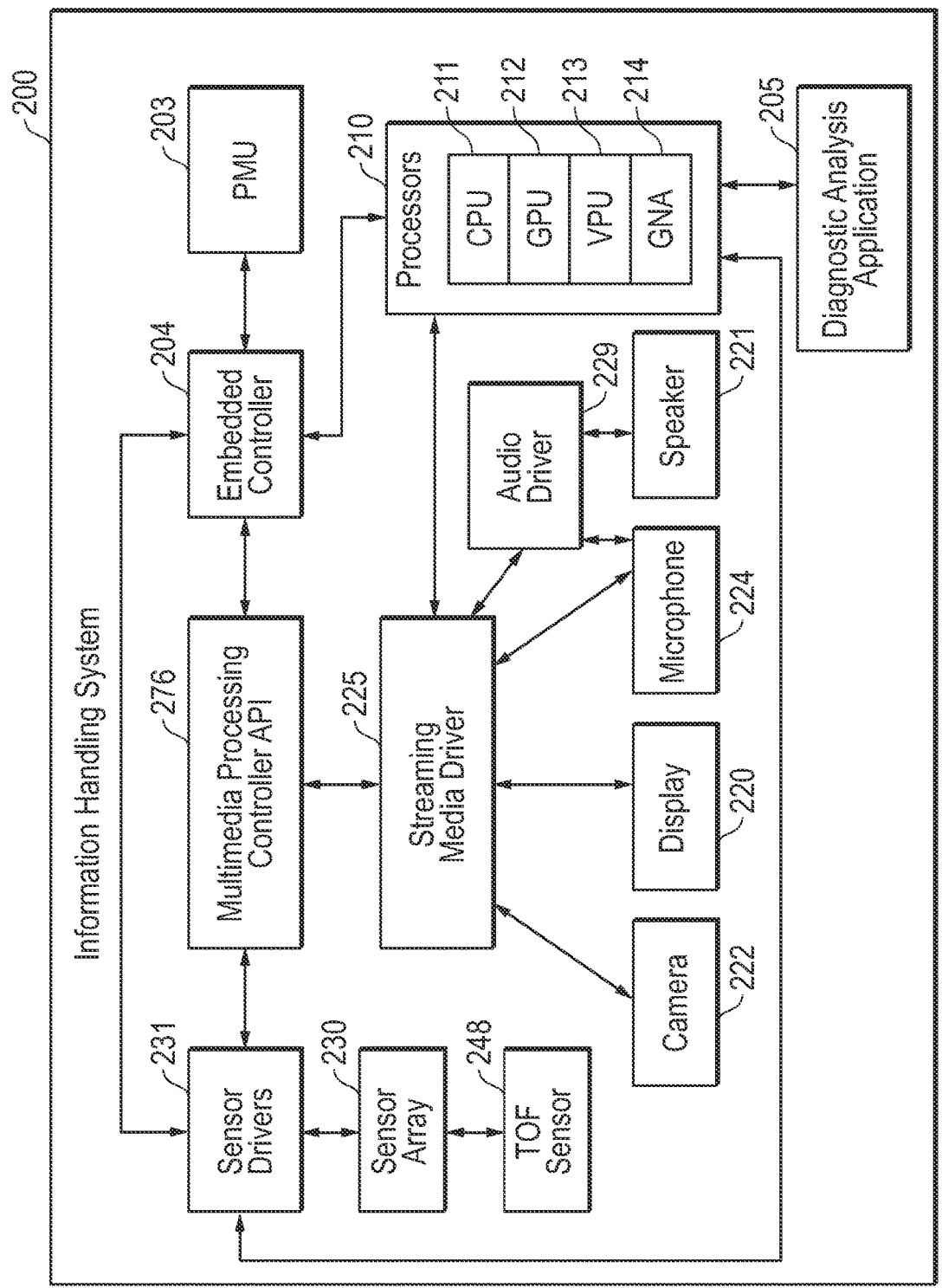
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices, software applications, and one or more processors according to an embodiment of the present disclosure. As described herein, the intelligent videoframe privacy monitoring management system may intelligently monitor or apply videoframe privacy alterations to adjust captured videoframes for a videoconference application in embodiments herein. The intelligent videoframe privacy monitoring management system may modify settings or invoke AV processing instruction modules applied to post-process such captured media samples to apply videoframe privacy alterations. In some embodiments, intelligent videoframe privacy monitoring management system may also optimize various media capture settings for peripheral devices used in the capture of media samples for videoconference sessions for a MMCA.

The intelligent videoframe privacy monitoring management system in an embodiment may make such videoframe privacy monitoring and optimized videoframe privacy adjustment determinations for each user of an individual information handling system (e.g., 200) separately. Such a determination may be made based upon a plurality of inputs including detected distance data of a user, people or objects, or a background in front of a video camera, captured images of a user, or various sensor readings taken at the information handling system. Additional inputs may include data describing hardware and software capabilities and performance metrics of the information handling system at issue, default AV processing instruction module settings generated by the MMCA, default media capture instructions, or meeting metrics describing user participation and performance of the MMCA.

These input values may be gathered from a plurality of sensors, peripheral devices, and diagnostic applications. For example, hardware performance metrics describing total processing load at one or more processors 210 may be gathered via an embedded controller 204 in an embodiment. The embedded controller 204 may also gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU 211, GPU 212, VPU 213, GNA 214, etc.) and with the power management unit (PMU) 203. In some embodiments, such communication may occur in kernel mode.

The intelligent videoframe privacy monitoring management system may determine videoconference interruption events have occurred and optimized videoframe privacy adjustments to apply from some or all of the input values described herein in an embodiment. In other embodiments, some or all of the intelligent videoframe privacy monitoring management system may utilize a neural network with some or all of the input values described herein to assist in determining that videoconference interruption events have occurred and what optimized videoframe privacy adjustments to apply.

As described in greater detail with reference to FIG. 5, the intelligent videoframe privacy monitoring management system may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200), including processing load across all available processors 210 (e.g., CPU 211, GPU 212, VPU 213, GNA 214), default settings associating specific processors (e.g., 210) with specific tasks, or state of remaining charge of the battery incorporated within the PMU 203, for example. Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized videoframe privacy measures such as generating optimized videoframe privacy adjustment functions for managed information handling systems in some embodiments. In some embodiments, portions of the intelligent videoframe privacy monitoring management system operate in whole or in part as a remote service from the user's information handling system.

As another example of gathering inputs for the intelligent videoframe privacy monitoring management system, or optionally a neural network, software performance metrics may be generated at a diagnostic analysis application 205, based at least in part on communication between the diagnostic analysis application 205 and the processor 210. Such a diagnostic analysis application 205 may operate to gather metrics describing CPU usage or load, as well as a breakdown of the CPU usage attributable to each of a plurality of applications (e.g., including a MMCA) running via the operating system of the information handling system 200. In some embodiments, the diagnostic analysis application 205 may provide similar metrics for other types of processors for the information handling system, including, for example, a graphics processing unit (GPU), vision processing unit (VPU), or gaussian neural accelerator (GNA). One example of such a diagnostic analysis application 205 in an embodiment may include the Microsoft® Diagnostic Data Viewer® software application. As described in greater detail with respect to FIG. 5, these software performance metrics may be generated at the diagnostic analysis application 205 and transmitted to the intelligent videoframe privacy monitoring management system or its neural network via multimedia processing controller API 276 for determination if any optimized videoframe privacy adjustments may cause involved AV processing instruction modules or other AV processing instruction modules to be better executed at an alternative processor.

In yet another example of gathering inputs for the intelligent videoframe privacy monitoring management system, various sensor readings, such as a TOF sensor 248 or other proximity sensors, may be taken by the information handling system 200 and communicated to the intelligent videoframe privacy monitoring management system. Any TOF sensor 248 may be used and may include laser, visual spectrum, near infrared (IR), or IR spectrum camera TOF sensors to determine distance data of a user, other persons or objects, or background elements based on time for light from a light source in a known location to bounce off of a person or object and be sensed by a camera sensor such as a charge coupled device (CCD). The TOF sensor 248 may have a light source and CCD or other camera sensor located in a known position relative to the camera system 222 used to capture videoframes according to an example embodiment. In some embodiments, camera system 222 may be part of the TOF sensor 248. Determination of distances in a space in front of the camera system 222 may be conducted via scanning such as with a light detection and ranging (LIDAR) system in one example embodiment. An example TOF sensor 248 may be an Intel® RealSense™ system in some embodiments.

The information handling system 200 may include one or more sensors within a sensor array 230, including TOF sensor 248. Other such sensors may include, for example, an ambient light sensor or a color sensor as well as other sensors of the information handling system that may be relevant to operation of the MMCA (e.g., a hall effect sensor or hinge rotation sensor, accelerometer, gyroscope, orientation sensor, light sensors, IR cameras, etc.).

Other examples of sensors within the sensor array 230 may include light sensors, infrared (IR) cameras, or geographic position sensors (e.g., GPS units). In some embodiments, one or more modules of the network interface device described with reference to FIG. 1 may constitute one of the sensors within the sensor array 230. For example, a GPS module may determine GPS coordinates for location of an information handling system. In another example, an antenna front end system of the network interface device may operate to determine location based on connection to one or more Wi-Fi networks or cellular networks. All sensor readings from sensors within the sensor array 230 in an embodiment may be transmitted to the sensor drivers 231. As described in greater detail with respect to FIG. 5, these sensor readings may be transmitted from the sensor drivers 231 to the intelligent videoframe privacy monitoring management system via the processor 210 and a multimedia processing controller API 276. Location sensors may indicate home or office use of an information handling system to assist in determining whether a videoconference call is a business meeting or a casual event, along with assessment of invited participants, to determine in some embodiments a type of optimized videoframe privacy adjustment that may be output by the intelligent videoframe privacy monitoring management system optionally executing a trained neural network. For example, whether to implement a privacy alteration to video frames when plural faces are detected. In a family or friendly call, plural faces may be desired, where in a formal or business call plural faces may be a videoconference interruption.

In still another example of gathering inputs for the intelligent videoframe privacy monitoring management system, default media capture instructions and default AV processing instruction module settings may be gathered via a streaming media driver 225 and transmitted to the intelligent videoframe privacy monitoring management system. Default media capture instructions in an embodiment may be generated by the MMCA, or may be preset by the manufacturer of the camera, microphone, or information handling system 200. Such default media capture instructions and optimized media capture instructions may dictate the method by which such audio, image, and video samples are captured. For example, media capture instructions may identify whether a camera is on, the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify whether a microphone is on or muted, or the bit rate at which the microphone 224 records and saves captured audio samples in coordination with an audio driver 229 in some embodiments. In some embodiments, default media capture instructions may be stored at the streaming media driver 225, which may operate to direct operation of the camera 222 or microphone 224. As described in greater detail with respect to FIG. 5, these default media capture instructions may be transmitted from the streaming media driver 225 to the intelligent videoframe privacy monitoring management system or its optional neural network via multimedia processing controller API 276.

It is contemplated that the information handling system 200 may include one or more cameras 222 (e.g., one camera for each of a plurality of videoconferencing displays oriented at different angles to a user), one or more displays (e.g., 220), one or more speakers 221, or one or more microphones 224 and an audio driver 229 in some embodiments. The streaming media driver 225 in an embodiment may be capable of gathering the default or current media capture settings pursuant to which the camera 222 or microphone 224 are capturing images and audio, respectively.

Figure 3:
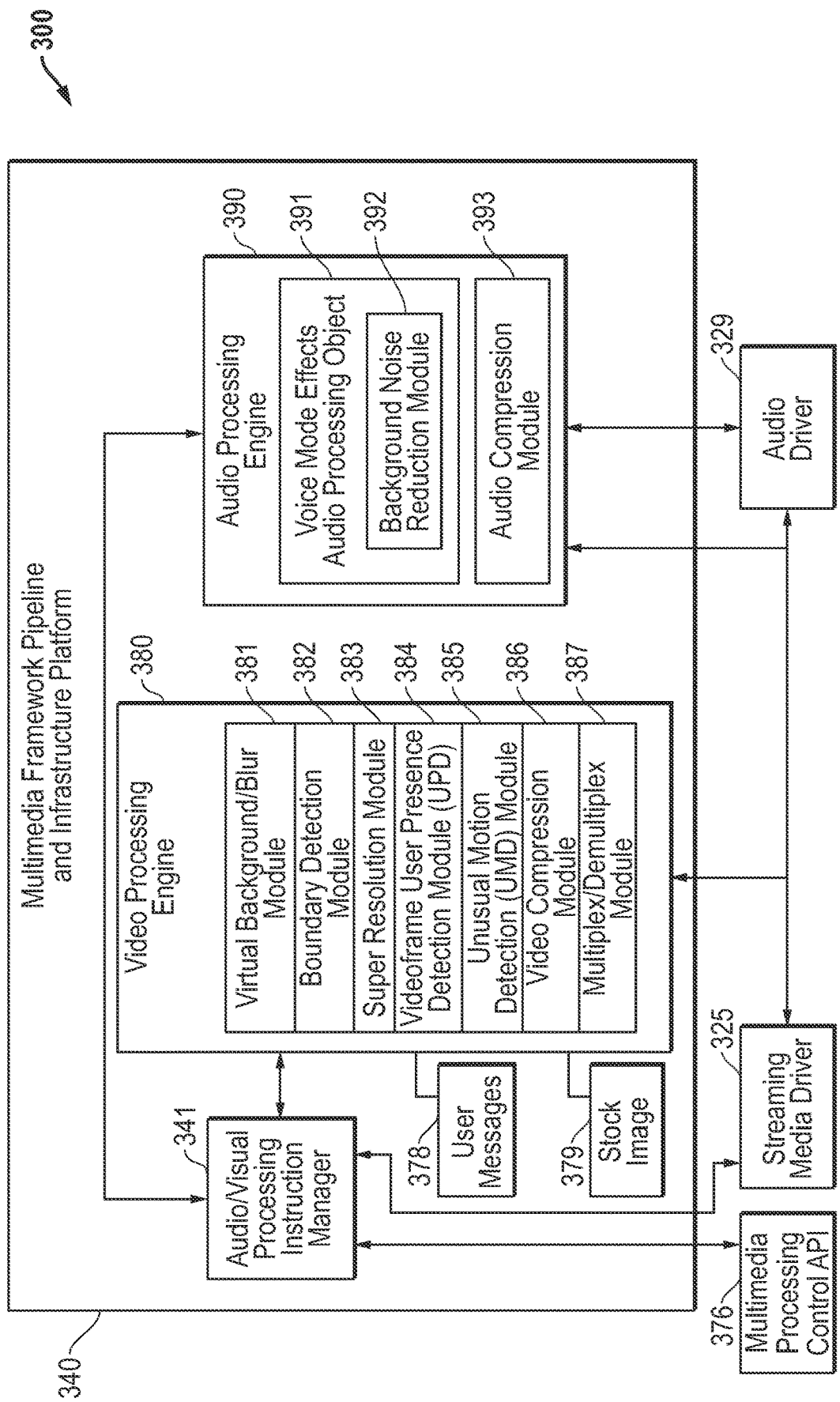
FIG. 3 is a block diagram illustrating a multimedia framework pipeline and infrastructure platform of an information handling system according to an embodiment of the present disclosure.

Upon determination of optimized videoframe privacy adjustments such as optimized media capture instructions, or AV processing instruction adjustments via the neural network of the intelligent videoframe privacy monitoring management system, these AV processing instruction adjustments may be transmitted to the AV processing manager, described further in FIG. 3. Instructions for execution of post processing privacy alterations or the optimized media capture adjustments may be transmitted to various components of the information handling system 200. For example, as described in greater detail with respect to FIG. 5, the intelligent videoframe privacy monitoring management system may transmit optimized videoframe privacy adjustments such as an instruction to apply a privacy alteration to captured videoframes to a multimedia processing control API 276. Such a multimedia processing control API 276 in an embodiment may transmit the optimized AV processing instruction adjustments or optimized media capture adjustment instructions to the streaming media driver 225 in one embodiment.

The streaming media driver 225 in an example embodiment may direct the operation of the camera 222 and the microphone 224 such that media (e.g., images, video samples, audio samples) is captured according to the optimized media capture instructions that may be altered for an optimized videoframe privacy adjustment to the image of a user. For example, the streaming media driver 225 in an embodiment may direct the camera 222 to turn off or capture images and generate video samples having the frames per second, zoom settings, pan settings, or number of key frames defined by the optimized media capture instructions. As another example, the streaming media driver 225 in an embodiment may direct the microphone 224 to turn off, mute, or to capture and generate audio samples having the bitrate defined by the optimized media capture instructions. In such a way, the intelligent videoframe privacy monitoring management system in an embodiment may optimize capture of media samples to optimize intelligent appearance monitoring or adjustment of videoconference sessions by the MMCA.

FIG. 3 is a block diagram illustrating a multimedia framework pipeline and infrastructure platform in communication with a plurality of drivers in order to process received media samples according to an embodiment of the present disclosure. As described herein, the intelligent videoframe privacy monitoring management system may determine various types of videoconference interruptions happening before the video camera system during execution of user videoconference sessions for a MMCA. The intelligent videoframe privacy monitoring management system may then generate optimized videoframe privacy adjustments to apply videoframe privacy alterations to captured videoframes in order intelligently monitor or adjust privacy of backgrounds or what appears in those videoframes captured by the MMCA in an embodiment.

The multimedia framework pipeline and infrastructure platform 340 may process media samples captured at the information handling system executing the multimedia framework pipeline and infrastructure platform 340 in one aspect of an embodiment. An example of such a multimedia framework pipeline and infrastructure platform 340 may include the Microsoft® Media Foundation Platform® for Windows®. The multimedia framework pipeline and infrastructure platform 340 in an embodiment may manage audio and video playback quality, interoperability, content protection, and digital rights management. The multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

The multimedia framework pipeline and infrastructure platform 340 in an embodiment may include an audio/visual (AV) processing instruction manager 341, a video processing engine 380, and an audio processing engine 390. The video processing engine 380 and audio processing engine 390 may each perform AV processing methods or algorithms to transform media samples. These AV processing methods may include a plurality of AV processing instruction modules (e.g., 381-387) available for execution to perform post processing on captured videoframes. Several of such methods may be performed serially to transform a single media sample in an embodiment, such as via a chaining algorithm. The AV processing instruction manager 341 in an embodiment may schedule or otherwise management performance of each of these methods, such as the AV processing instruction modules, in turn.

In one aspect of an embodiment, a camera or microphone operably connected to the information handling system 300 may operate as the media data source. In such an embodiment, the AV processing instruction manager 341 in an embodiment may operate to retrieve a media sample from a media data source, based on a media capture instruction. The AV processing instruction manager 341 may transmit a media capture instruction to the streaming media driver 325 in an embodiment. As described in greater detail with respect to FIG. 5, the multimedia framework pipeline and infrastructure platform 340 may also be in communication with the MMCA and a multimedia processing control API 376. Via such communications, the multimedia framework pipeline and infrastructure platform 340 may receive default media capture instructions from the MMCA. The multimedia framework pipeline and infrastructure platform 340 may also receive optimized media capture instructions for the trained intelligent videoframe privacy monitoring management system via the multimedia processing control API 376.

The streaming media driver 325 in such an embodiment may receive media data such as video or audio samples captured by peripheral cameras or microphones in communication therewith, according to default or optimized media capture instructions, as described with reference to FIG. 2. The streaming media driver 325 may receive video samples captured by a camera system. In another embodiment, an audio driver 329 may receive audio samples captured by a microphone, according to such received media capture instructions. In such an embodiment, the audio driver 329 may operate as a mini-driver or child device to the parent device streaming media driver 325. The streaming media driver 325 may be in communication with the AV processing instruction manager 341 via one or more ports (e.g., as described in greater detail with respect to the device proxy 442 of FIG. 4) such that video or audio samples received by the streaming media driver 325 may be transmitted to the AV processing instruction manager 341 in an embodiment. The audio driver 329, if separate, may also be in communication with the AV processing instruction manager 341 in an embodiment. In such a way, the AV processing instruction manager 341 may direct retrieval of a video sample captured at a camera operably connected to information handling system 300 and retrieval of an audio sample captured at a microphone operably connected to information handling system 300.

In another aspect of an embodiment, an information handling system in communication with the information handling system 300 over a network (e.g., world wide web) may operate as the media source. This remote information handling system may be participating in the same user videoconference session of the MMCA as the information handling system 300 in an embodiment. In such an embodiment, the MMCA at the information handling system 300 may access streaming media samples via a Unique Resource Identifier (URI) defined by the MMCA, through the network interface device (e.g., as described with reference to FIG. 1). The MMCA in such an embodiment may then transmit the retrieved media sample (e.g., as generated at a remote information handling system) to the multimedia framework pipeline and infrastructure platform for reprocessing, and decoding. In such a way, the AV processing instruction manager 341 of the multimedia framework pipeline and infrastructure platform 341 in an embodiment may retrieve or receive a media sample that has been captured, processed, and encoded at a remote information handling system, such as video or audio of other participants in a video conference.

As described herein, the multimedia framework pipeline and infrastructure platform 340 may also operate to perform one or more processing methods on the retrieved audio and video samples coming from another video conference participant. The AV processing instruction manager 341 in an embodiment may operate to apply one or more AV processing instruction modules to the retrieved AV sample. The AV processing instruction manager 341 may direct whether or the order in which various AV processing instruction modules, are employed on media samples. The video processing engine 380 may operate to apply one or more video processing AV processing instruction modules to a video sample, each implemented by a separate module, according to execution instructions received from the AV processing instruction manager 341. The audio processing engine 390 may operate to apply one or more audio processing AV processing instruction modules to an audio sample, each implemented by a separate audio processing object, according to execution instructions received from the AV processing instruction manager 341.

In an embodiment in which the camera or microphone operably connected to the information handling system 300 operates as the media source, the one or more AV processing instruction modules may include application of a codec to compress each of the audio sample and the video sample as required for transmission of media samples across the internet, and playback of those media samples by a MMCA, and a multiplexer to coalesce the compressed audio sample and compressed video sample into a processed, encoded (e.g., by a codec) media sample. Other processing methods in an embodiment may be dictated by one or more features of the MMCA, or optimized instructions received from the intelligent videoframe privacy monitoring management system, as described herein.

The video processing engine 380 may operate at the direction of the AV processing instruction manager 341 to perform one or more of the algorithms associated with the plurality of modules within the video processing engine 380. Several AV processing instruction modules are contemplated for execution during operation of the MMCA including several not depicted in FIG. 3 such as an eye contact correction module to operate in an embodiment in which multiple video media samples are captured from a plurality of cameras, user framing module operating to identify a user's face and center the face within the captured videoframes, user zoom modules to select an appropriate zoom level on the user image in the videoframe based on distance from a camera, a zoom and face normalizer module that operate to crop, enlarge, or scale down various captured images constituted the captured video sample to normalize the size of the user's face across each of the captured images, shading adjustment modules, color blending modules, and others.

In embodiments herein, the video processing engine 380 may receive one or more outputs from an intelligent videoframe privacy monitoring management system for generating a user notification message 378 to indicate detection of a videoconference interruption, indicate that a privacy alteration has been applied, or ask a user whether to apply or terminate application of a privacy alteration. Such messages 378 may be generated by the intelligent videoframe privacy monitoring management system in some embodiments or may be stored in whole or in part in a database memory by the intelligent videoframe privacy monitoring management system. The user messages 378 may be accessible to the video processing engine 380 for display on the display screen of a user's information handling system for example. Any solicited user feedback may be provided, in some embodiments, to any optional intelligent videoframe privacy monitoring management system neural network for further training.

In other embodiments herein, the video processing engine 380 may receive one or more output optimized videoframe privacy adjustments from an intelligent videoframe privacy monitoring management system, optionally including a trained neural network, for causing a privacy alteration to the captured video frames or audio capture in response to detection of a videoconference interruption. Videoconference interruption events may include detecting a user's absence, detecting plural faces, or detecting background movement. In an example embodiment, the intelligent videoframe privacy monitoring management system may be set with a stock image 379 selected by a user via a user interface and that is identified to be used in replacing the videoframes in response to detecting a videoconference interruption. The intelligent videoframe privacy monitoring management system may store such stock image or stock images 379 in a memory accessible by the video processing engine 380. The video processing engine 380 may be instructed by an optimized videoframe privacy adjustment from a trained neural network to access replace the captured video frames with one or more stock images 379.

In yet other embodiments, the video processing engine 380 may receive one or more output optimized videoframe privacy adjustments from the intelligent videoframe privacy monitoring management system, optionally including a trained neural network, to apply a privacy alteration to a captured videoframe in response to detecting a videoconference interruption by invoking one or more AV processing instruction modules, such as 381 or 382 or other AV processing instruction modules to process the captured videoframes in various embodiments according to the present disclosure.

Additionally, the video processing engine 380 may also invoke or execute instructions of one or more AV processing instruction modules 381-387 or others not shown when determining inputs for intelligent videoframe privacy monitoring management system. For example, a videoframe user presence detection (UPD) module 384 may work with a TOF sensor or other proximity sensor to provide input distance data of a user, objects, or other background elements into a trained neural network in an embodiment. Such input distance data may be used by the intelligent videoframe privacy monitoring management system, or optionally a trained neural network, to determine a user's presence or absence, or whether there are plural faces in front of the video camera system. In yet another embodiment, an unusual motion detection (UMD) module 385 may be utilized to assess a series of videoframes to determine and identify motion beyond a particular threshold or located in a particular part of the videoframe. Motion data from the UMD module 385 may be input into the intelligent videoframe privacy monitoring management system, or optionally a trained neural network, to assist in determining whether background motion is occurring in the videoframe as a videoconference interruption.

Further, the video processing engine 380 may also invoke or execute instructions of one or more AV processing instruction modules 381-387 or others not shown as part of optional or required videoframe post processing or audio processing modules 392 when conducting a videoconference session via the MMCA, whether or not an intelligent videoframe privacy monitoring management system is executing as well in various embodiments herein.

As shown in FIG. 3 for example, a virtual background generation or blur module 381 in an embodiment may operate in an embodiment in which a user selects a virtual background or selects to blur a portion of the video frame. In some embodiments, a virtual background or blur of background portions of an image may be applied for privacy reasons or other reasons to allow a user to determine what is seen behind the user while speaking. In an example embodiment, a user boundary detection module 382 may be used to identify which portion of the videoframe is the user and which portion is background. The virtual background generation module or virtual background or blur module 381 may be used in some embodiments to blur or overlay a virtual background image on the background portion of the videoframe around the image of the user.

In other embodiments, the virtual background generation or blur module may be utilized to overlay an image or to blur the portion of the videoframe that is identified as plural faces other than the user, which may be determined as the closest face from the input distance data. For example, one type of optimized videoframe privacy adjustment output from an intelligent videoframe privacy monitoring management system may be an optimized videoframe privacy adjustment instruction to blur some or all of the image of the background or other faces in the videoframe in response to detecting a videoconference interruption such as absence of the user, plural faces, or background movement in the videoframes. Such an optimized videoframe privacy adjustment output from the intelligent videoframe privacy monitoring management system may be an instruction for an output AV processing instruction adjustment to adjust or invoke a processing method applied to the videoframes captured during a videoconference session as described in various embodiments of the present disclosure.

The boundary detection module 382 in an embodiment may operate to identify a user's image boundary, including for identification of a user's head, face, hair, and body, as described above for several purposes. Such boundary detection may be used for overlaying a virtual background image/blur on the background portion of the videoframes around the user boundary in some embodiments. As described, the boundary detection module may also be used to determine the location of the user for application of blur or another image or color on some or all of the user's image portion of the videoframes. In yet another embodiment, the boundary detection module 382 may detect the user's face, head, or body boundaries to identify the user's face, hair or the like within each captured image making up the video sample. In this way, other processing methods for AV processing instruction modules, not shown, may be implemented including gaze correction, face framing, automatic zoom adjustments, shading or color adjustments to the user's image among others. In an embodiment, the super resolution module 383 may recover a high-resolution image from a low-resolution image, using a known degradation function. It is contemplated other AV processing instruction modules known in the art may also be employed, such as a hand detection algorithm, for example.

The compression module 386 in an embodiment may perform one or more algorithms or digital transforms to compress or decompress the received and processed video sample. Various compression algorithms may be employed in various embodiments. In some embodiments, the compression algorithm used may conform to one or more standards, selected or identified for use by the MMCA. For example, the MMCA may require all media samples transmitted to sinks (e.g., Universal Resource Identifiers or URIs) accessible by various agents or APIs of the MMCA executing across a plurality of information handling systems, adhere to the Motion Picture Experts Group 4 (MPEG-4) standard established by a Joint Technical Committee (JTC) of the International Organization for Standardization and International Electrotechnical Commission (IOS/IEC). This is only one example of a standard required by the MMCAs in an embodiment, and is meant to be illustrative rather than limiting. It is contemplated the video processing engine 380 in an embodiment may include various modules for encoding or decoding video samples or media samples using any known, or later developed standards.

The MPEG-4 standard may define one or more algorithms or AV processing instruction modules (e.g., reduced-complexity integer discrete cosine transform) that may be used to compress and decompress video samples or audio samples. For example, the H.264 Advanced Video Coding (AVC), defined by part 10 of the MPEG-4 standard is the most widely used codec by video developers. Other video compression algorithms available under the MPEG-4 standard may also define 3D graphics compression (e.g., part 25), web video coding (e.g., part 29), internet video coding (e.g., part 33), and video coding for browsers (e.g., part 31). Each of these compression algorithms may be associated with different processing requirements for coding or decoding streaming media data in an embodiment. For example, the H.264 compression algorithm may require more processing resources than the video coding for browsers compression algorithm. Thus, the load placed on the processor executing such algorithms in an embodiment may be increased or decreased by choosing one of these compression algorithms over another.

Upon application of all other AV processing instruction modules to be applied in an embodiment, the multiplex module 387 may combine or coalesce the processed video sample and the processed audio sample into a single, processed and encoded (e.g., via the video compression module 386) media sample for transmission. The same, similar, or complimentary AV processing instruction modules may be performed on remotely captured media samples received at the information handling system 300 for demultiplexing, decoding, and display or presentation on the information handling system 300, as described in greater detail below. The AV processing instruction modules 381-387 and others not shown in FIG. 3 may comprise machine executable code instructions executing at various controllers or processors of the information handling system 300. Any one or more of these AV processing instruction modules may be routinely applied pursuant to instructions received from the MMCA (e.g., boundary detection, virtual background) and may be applied to a captured video sample in an embodiment. Further, each of the algorithms executed by these AV processing instruction modules may be implemented in any order. In some embodiments, one or more of the algorithms executed by these modules require a particular order.

The audio processing engine 390 may operate to process audio samples, and may include, for example, a voice mode effects audio processing object 391 and an audio compression module 393. The audio compression module 393 in an embodiment may apply a compression algorithm or codec to the captured audio sample to compress it. Several audio codecs may be used under part 3 of the MPEG-4 standard, including Advanced Audio Coding (AAC), Audio Lossless Coding (ALS), and Scalable Lossless Coding (SLS), among others. As with the video compression algorithms described directly above, each of these audio compression algorithms may be associated with different processing requirements for coding or decoding streaming audio samples in an embodiment.

The voice mode effects audio processing object 391 in an embodiment may include modules for application of other digital signal processing effects, including, for example, a background noise reduction module 392. In an embodiment, the background noise reduction module 392 may operate to isolate the user's voice from surrounding background noise and either amplify the user's voice, or reduce or remove the background noise. In other embodiments, the voice mode effects audio processing object 391 may include other modules for further digital signal processing effects, including voice modulation, graphic equalization, reverb adjustment, tremolo adjustment, acoustic echo cancellation, or automatic gain control. It is contemplated any known or later developed digital signal processing effects commonly used in MMCAs may also be executed as one or more modules within the voice mode effects audio processing object 391 in various embodiments. Any one or more of these voice mode effects audio process object modules (e.g., 392) may be applied to a captured audio signal in an embodiment. An example embodiment, one type of optimized videoframe privacy adjustment output from the intelligent videoframe privacy monitoring management system may be an audio adjustment instruction to mute some or all of the audio data of the user in the videoframe in response to detecting a videoconference interruption, such as the user's absence, plural faces, or background movement in the videoframes. In response to a detected videoconference interruption in one example embodiment, the videoframe privacy monitoring management system neural network may output an optimized videoframe privacy adjustment as an audio capture adjustment to alter the audio data by an AV processing instruction adjustment to an audio process object module 392 to mute the audio of the user in videoframes such as when a cough or sneeze is detected. The audio data mute for the associated videoframes may be ongoing, may last for a duration of the videoconference interruption event, or may last longer in various embodiments.

In other embodiments, the audio processing engine 390 may perform compression of the audio sample via the audio compression module 393. As described directly above, following processing and encoding or compression of the audio sample in such a way, the AV processing instruction manager 341 may instruct the video processing engine 381 to multiplex or combine the processed and encoded video sample with the processed and encoded audio sample to generate a processed and encoded media sample. In such a way, the video processing engine 380 and audio processing engine 390, operating pursuant to execution instructions received from the AV processing instruction manager 341, may combine an audio sample with a video sample, both captured at the information handling system 300, into a single, processed and encoded media sample, such that the processed and encoded media sample may be transmitted or streamed to other information handling systems via a network (e.g., the world wide web).

In an embodiment in which the media source is a URI enabling access to a streaming media sample generated from a remote information handling system engaged in the same user videoconference session of the MMCA, the AV processing instruction manager 341 may direct the performance by the video processing engine 380 or the audio processing engine 390 of demultiplexing the received media sample into an encoded audio sample and an encoded video sample. For example, the AV processing instruction manager 341 may direct the demultiplex module 387 of the video processing engine 380 to demultiplex or split the audio sample from the video sample within the received media sample. This may be referred to herein as "reprocessing" the received media sample. Upon demultiplexing, the AV processing instruction manager 341 may instruct the video processing engine 380 to perform one or more further AV processing instruction modules on the demultiplexed video sample. For example, the video compression module 381 may decode or decompress the demultiplexed video sample into a format that may be transmitted via the streaming media driver 325 to a digital display for playback. In other embodiments, one or more of the other modules may also perform similar or identical algorithms to those described above with respect to video samples captured at the information handling system 300. The AV processing instruction manager 341 may also instruct the audio processing engine 390 to perform one or more further AV processing instruction modules on the demultiplexed audio sample in an embodiment.

As also described herein, the multimedia framework pipeline and infrastructure platform 340 may operate to transmit a media sample to a media sink. In an embodiment in which the camera or microphone operably connected to the information handling system 300 operates as the media source, an information handling system located remotely from information handling system 300 and engaged in the same user videoconference session for the MMCA as information handling system 300 may operate as the media sink. In such an embodiment, the multimedia framework pipeline and infrastructure platform 340 may stream the processed and encoded media sample over a network (e.g., world wide web) via a URI defined by the MMCA, such that a plurality of other information handling systems engaged in the same user videoconference session for the MMCA may access the streaming media sample.

In an embodiment in which the media source is a URI enabling access to a streaming media sample generated from a remote information handling system engaged in the same user videoconference session of the MMCA, the digital display of information handling system 300 may operate as the media sink. In such an embodiment, the video sample demultiplexed and decoded from the processed and encoded media sample retrieved from the URI defined by the MMCA may be transmitted to the streaming media driver 325 for playback of the video via the digital display of the information handling system 300 (e.g., as described in greater detail with reference to FIG. 6). In another aspect of such an embodiment, the audio sample demultiplexed and decoded from the processed and encoded media sample retrieved from the URI defined by the MMCA may be transmitted to the streaming media driver 325 for playback of the video via an operably connected speaker of the information handling system 300 (e.g., as described in greater detail with reference to FIG. 6). In such a way, the multimedia framework pipeline and infrastructure platform 340 may operate to retrieve audio and video samples from a media source, perform one or more processing methods on the retrieved audio and video samples including any optimized videoframe privacy adjustment, multiplex the audio and video samples together to form a processed media sample, and transmit the processed media sample to a media sink.

Figure 4:
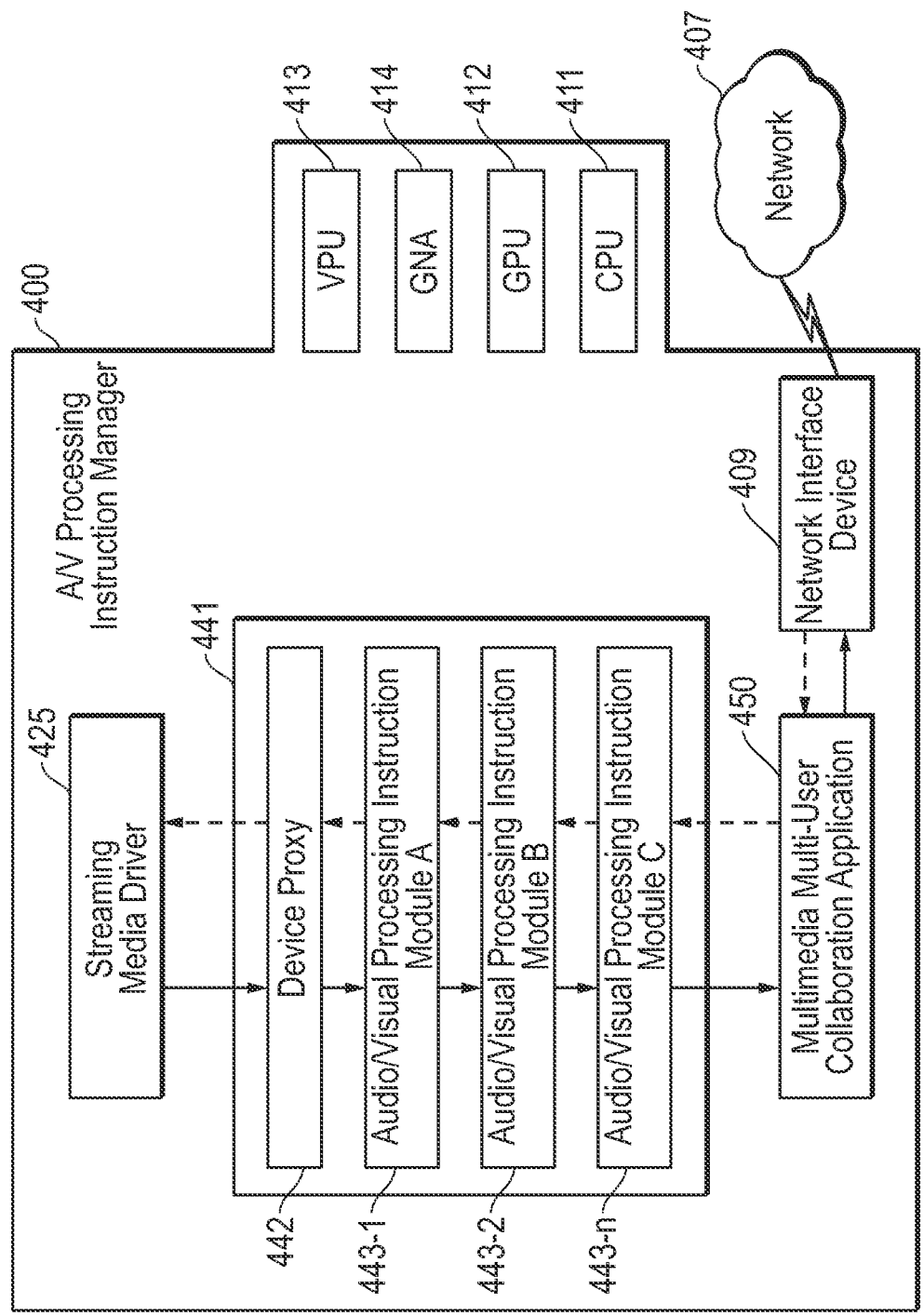
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating an AV processing instruction manager operating to process media samples transmitted between a streaming media driver and an MMCA of an information handling system according to an embodiment of the present disclosure. The AV processing instruction manager 441 of a multimedia framework pipeline and infrastructure platform may operate to retrieve audio and video samples (e.g., videoframes) from a camera or microphone, perform one or more processing methods on the retrieved audio and video samples, multiplex the audio and video samples together to form a processed media sample, and transmit the processed media sample from a media source information handling system to a media sink information handling system.

The information handling system 400 may act as a media sink and a media source, depending upon the location at which such media samples are captured. For example, in an embodiment in which the camera of an information handling system 400 captures video samples and a microphone of the information handling system 400 captures audio samples, both pursuant to media capture instructions received by the AV processing instruction manager 441, the information handling system 400 may act as the media source and transmit media samples to a media sink information handling system. Movement of such captured video samples, audio samples, and processed and encoded media samples throughout various post-capture media processing methods in such an embodiment may be represented in FIG. 4 by the flat or non-dashed arrows to indicate that post-capture media processing methods may be chained and operate in any order.

In an embodiment in which the information handling system 400 acts as a media source, the streaming media driver 425 (or other drivers) may execute media capture instructions received from the AV processing instruction manager 441 to instruct capture of video samples via one or more cameras and capture of audio samples via one or more microphones of information handling system 400. As described herein, such media capture instructions may include default media capture instructions stored at the streaming media driver 425 or other drivers, default media capture instructions generated by the MMCA 450, or optimized media capture instructions generated by the intelligent videoframe privacy monitoring management system.

Upon capture of such video samples and audio samples in an embodiment, the streaming media driver 425 (or other drivers) may transmit the captured video and audio samples to the AV processing instruction manager 441 via a device proxy 442. The device proxy 442 in an embodiment may comprise code instructions operating at a controller. In an embodiment, the device proxy 442 may route or map connections between physical pins of the streaming media driver 425 (or other drivers) and the AV processing instruction manager 441. The streaming media driver 425 may comprise firmware or software code instructions executable to allow communication between various media hardware (e.g., camera, microphone, speakers, display) and the operating system (OS). The AV processing instruction manager 441 in an embodiment may comprise code instructions executable within the OS environment via one or more processors (e.g., VPU 413, GNA 414, GPU 412, or CPU 411) of the information handling system 400. As the AV processing instruction manager 441 manages execution of either a video sample or an audio sample in such an embodiment, the AV processing instruction manager 441 may employ the device proxy 442 to retrieve the video sample from one of the physical pins within a driver operably connected to the camera prior to execution of a video processing method. Similarly, the AV processing instruction manager 441 may employ the device proxy 442 to retrieve the audio sample from one of the physical pins within a driver operably connected to the microphone prior to execution of an audio processing method. The communication between the streaming media driver 425 and the device proxy 442 in such an embodiment may be executed by the AV processing instruction manager 441 executing code in kernel mode on the CPU 411 in an embodiment.

The AV processing instruction manager 441 in an embodiment may apply one or more AV processing instruction modules, each representing processing methods, on the audio sample and the video sample. For example, the AV processing instruction manager 441 in an embodiment may perform an AV processing instruction module A 443-1 for providing features specific to the MMCA 450, perform AV processing instruction module B 443-2 for compressing an audio sample or a video sample, one or more additional AV processing instruction modules, and perform any additional AV processing instruction module C 443-n, such as multiplexing the processed and encoded audio and video samples together to form a processed and encoded media sample. In an example embodiment, the AV processing instruction modules 443-1 to 443-n may be any number of AV processing instruction modules that may be executed via the AV processing instruction manager 441 for the MMCA 450 in processing captured audio or visual data by the video processing engine or the audio processing engine. In example embodiments, any of the AV processing instruction modules 443-1 to 443-n may correspond to the AV processing instruction modules shown or described in FIG. 3 or elsewhere in the present disclosure and may be invoked or adjusted by the intelligent videoframe privacy monitoring management system issuing an optimized videoframe privacy adjustment that provides for an alteration of a user's image in the videoframes. In such an embodiment, the processed and encoded media sample may then be transmitted or streamed to the MMCA 450, where it will be streamed to a URI in the network 407 via the network interface device 409. The information handling system 400 will thus function as a media source.

In an embodiment in which the information handling system 400 acts as the media sink, the MMCA 450 may retrieve a processed and encoded media sample from a URI within network 407, via the network interface device 409. Upon retrieval of such a processed and encoded media sample captured at an information handling system acting as the media source and located remotely from information handling system 400, the AV processing instruction manager 441 may retrieve the processed and encoded media sample from the MMCA 450 via network interface device 409. The AV processing instruction manager 441 in an such embodiment may apply one or more AV processing instruction modules, each representing processing methods, on the received media sample, processed and encoded at the remote media source information handling system. For example, the AV processing instruction manager 441 in an embodiment may perform an AV processing instruction C 443-n for demultiplexing or splitting a video sample from an audio sample within the processed and encoded media sample. The AV processing instruction manager 441 in such an embodiment may also perform an AV processing instruction B 443-2 for decoding the audio sample and the video sample, respectively, and perform any additional AV processing instruction modules C 443-n such as providing features specific to the MMCA 450, such as super resolution. In such an embodiment, the re-processed (e.g., demultiplexed) and decoded audio and video samples may then be transmitted to the streaming media driver 425 (or other drivers of the information handling system 400) for playback via a digital display and speakers operably connected to the information handling system 400.

The information handling system 400 in an embodiment may include a plurality of processors, including, for example, a central processing unit (CPU) 411, a graphics processing unit (GPU) 412, a vision processing unit 413, and a Gaussian neural accelerator (GNA) 414. The CPU 411 in an embodiment may execute the bulk of tasks relating to all software applications running via the operating system (OS), which may include the MMCA 450, the multimedia framework pipeline and infrastructure platform incorporating the AV processing instruction manager 441, as well as several others. Increased processing load placed on the CPU 411 by the AV processing instruction manager 441 during execution of a user videoconference session for the MMCA 450 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the MMCA throughout a typical workday.

The GPU 412 in an embodiment may be a processor specialized for rapidly manipulating and altering AV data in memory to accelerate the creation of a video sample using a plurality of captures images stored in a frame buffer. GPU 412 may be more efficient at manipulating such stored video samples during image processing performed by one or more of the AV processing instruction modules (e.g., 443-1, 443-2, and 443-n) in an embodiment. The VPU 413 in an embodiment may be specialized for running machine vision algorithms such as convolutional neural networks (e.g., as used by the user framing module, super resolution module, zoom and face normalizer module, or eye contact correction modules described with reference to FIG. 3). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-n. The GNA 414 may operate in an embodiment to offload continuous inference workloads from the CPU 411, GPU 412, or VPU 413, including but not limited to noise reduction or speech recognition, to save power and free CPU 411 resources.

Each of the AV processing instruction modules (e.g., 443-1, 443-2, and 443-n) in an embodiment may be sets of algorithms or code instructions executed via the operating system (OS), using one of the processors of the information handling system 400 for modification of video data or audio data relating to streaming video conferencing applications. It is understood that any number of AV processing instruction modules is contemplated in discussing 443-1 through 443-n. A single processor may execute each of the AV processing instruction modules (e.g., 443-1, 443-2, and 443-n), a sub-group thereof, or may even execute a single AV processing instruction, according to various embodiments. The AV processing instruction manager 441 in an embodiment may determine which processor to access in order to execute each AV processing instruction (e.g., 443-1, 443-2, and 443-n) in an embodiment, based on offload instructions received from the intelligent videoframe privacy monitoring management system in some embodiments. For example, in an embodiment in which the information handling system 400 acts as the media source, the AV processing instruction manager 441 may access the VPU 413 or the GNA 414 to execute various video or audio processing algorithms supported by the features of the MMCA, as represented by AV processing instruction A 443-1, pursuant to an optimized offload instruction to avoid executing that AV processing instruction using the GPU 412 or CPU 411. As another example in such an embodiment, the AV processing instruction manager 441 may access the GPU 414 or CPU 411 to execute the audio or video compression algorithm represented by AV processing instruction C 443-n. In yet another example in such an embodiment, the AV processing instruction manager 441 may access CPU 411 to multiplex the processed and encoded audio and video samples into a processed and encoded media sample.

In another example embodiment in which the information handling system 400 acts as the media sink, to receive media samples captured at a remotely located information handling system, the AV processing instruction manager 441 may offload execution of the audio or video decompression algorithm represented by AV processing instruction C 443-n to the GPU 412. In another example of such an embodiment, the AV processing instruction manager 441 may offload execution of various video or audio processing algorithms supported by the features of the MMCA, as represented by AV processing instruction B 443-2 to the GPU 412, GNA 414, or VPU 413. In such a way, the AV processing instruction manager 441 may retrieve audio and video samples from an external media source information handling system and perform one or more processing methods on the retrieved audio and video samples pursuant to optimized videoframe privacy adjustment instructions received from the intelligent videoframe privacy monitoring management system or the MMCA 450.

Figure 5:
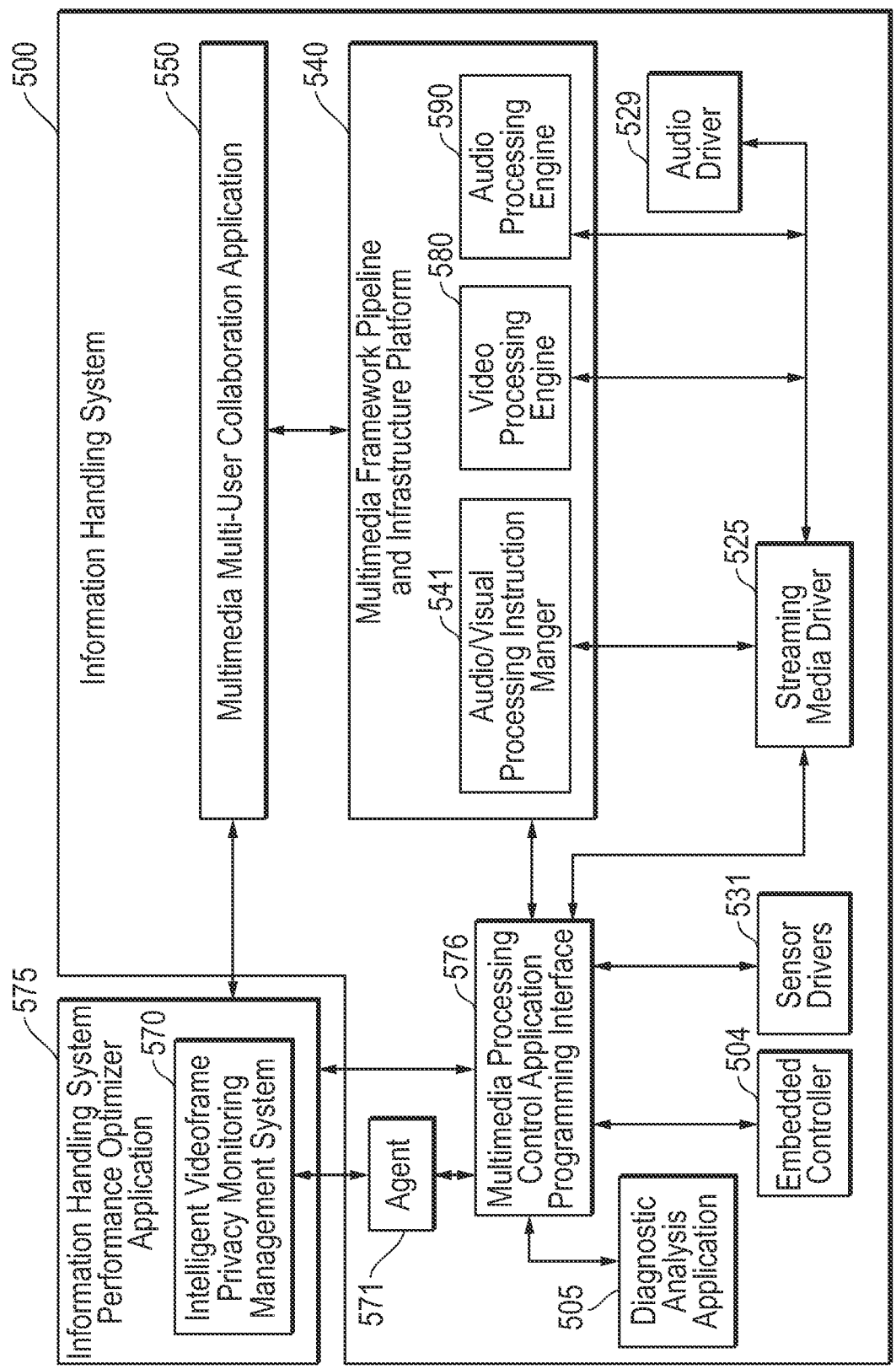
FIG. 5 is a block diagram illustrating a first embodiment of an intelligent videoframe privacy monitoring management system for optimizing information handling system usage of a multimedia, multi-user collaboration application by a user according to an embodiment of the present disclosure.

FIG. 5 is a block diagram illustrating a first embodiment of an intelligent videoframe privacy monitoring management system for intelligently monitoring videoframe privacy in captured videoframes during a videoconference session according to embodiments of the present disclosure. The intelligent videoframe privacy monitoring management system may train and use a trained neural network to identify user videoconference interruptions, their context, or the casual versus formal/professional context of the videoconference in some optional embodiments. The intelligent videoframe privacy monitoring management system may then process captured videoframes apply a videoframe privacy alteration for transmission and display pursuant to an optimized videoframe privacy adjustment instructions during a user videoconference session of a MMCA according to an embodiment of the present disclosure. As described herein, the intelligent videoframe privacy monitoring management system 570 are code instructions executing on one or more processors of an information handling system. The intelligent videoframe privacy monitoring management system 570 in an embodiment may generate optimized videoframe privacy adjustment instructions for providing a software service to user-participants of intelligently monitoring videoframe privacy during a videoconference session performed via the MMCA 550.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the MMCA 550 to display videos of other participants within a shared user videoconference session of a video conferencing system.

Execution of the intelligent videoframe privacy monitoring management system may be, in whole or in part, on a remote information handling system such as one executing the information handling system performance optimizer application 575 or may be local to a user, in whole or in part, on information handling system 500 participating in a videoconference in some embodiments. In one example embodiment, the intelligent videoframe privacy monitoring management system 570 may be an application operating within the OS for the information handling system 500, including execution of an optional trained neural network for determining optimized videoframe privacy adjustment instructions as described herein. For example, the information handling system 500 may execute any or all of the intelligent videoframe privacy monitoring management system 570 via a processor (e.g., processor 102 executing code instructions of the intelligent videoframe privacy monitoring management system 170, described with reference to FIG. 1) or embedded controller 504. In another example embodiment, the intelligent videoframe privacy monitoring management system 570 may be an application operating as part of an information handling system performance optimizer application 575 at an information handling system located remotely from the information handling system 500. In such an example embodiment, an agent 571 or portion of the intelligent videoframe privacy monitoring management system 570 may be operating at the information handling system 500. The agent 571 of the intelligent videoframe privacy monitoring management system 570 in such an embodiment may be in communication with the multimedia processing control API 576 via an internal bus of information handling system 500, and in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

The intelligent videoframe privacy monitoring management system 570 in an embodiment may make optimized videoframe privacy adjustment instructions as described herein on a per information handling system (and per user) basis. Such a determinations may be made based upon a plurality of inputs including sensed distance data of a user, other persons or objects, or other background elements, captured videoframes with current user images as well as inputs describing hardware and software performance metrics of the information handling system (e.g., 500) at issue, default media capture instructions, default AV processing instruction module setting settings generated by the MMCA (e.g., 550), and various other sensor readings taken at the information handling system (e.g., 500). Additionally, inputs to the intelligent videoframe privacy monitoring management system 570, and an optional neural network, may include meeting metrics for the MMCA describing performance of that application and videoconference participant identification data or context of the videoconference session in some embodiments. These input values may be gathered from the video camera and a plurality of sensors, peripheral devices, and diagnostic applications, such as described in various example embodiments herein.

The multimedia processing control application programming interface 576 in an embodiment may operate, at least in part, as a hub, facilitating communication of each of these performance metrics, media capture instructions, and various sensor readings to the intelligent videoframe privacy monitoring management system 570, or agent 571 thereof. For example, processing capabilities may indicate processor types available or Random Access Memory (RAM) or other memory capabilities of an information handling system. In a further example, hardware performance metrics describing total processing load at one or more processors may be gathered via an embedded controller 504 in an embodiment, and transmitted to the multimedia processing control API 576. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information system performance optimizer application 575 may be via a wireless network such as Wi-Fi or cellular, or via wired connection.

As described herein, the multimedia processing control API 576 may operate, at least in part, as a hub to facilitate communication between various hardware, firmware, and software applications operating at information handling system 500, and the intelligent videoframe privacy monitoring management system 570. As another example of this, the multimedia processing control API 576 may receive software performance metrics generated at a diagnostic analysis application 505, describing applications available or running, number of videoconference participants, CPU usage or load, as well as a breakdown of the CPU usage attributable to each of a plurality of applications (e.g., including a MMCA 550) running via the operating system of the information handling system 500. The multimedia processing control API 576 may forward these software performance metrics to the intelligent videoframe privacy monitoring management system 570 in an embodiment.

In yet another example of the multimedia processing control API 576 facilitating communication with the intelligent videoframe privacy monitoring management system 570 the multimedia processing control API 576 may receive sensor readings taken from one or more sensors of the information handling system 500 (e.g., a TOF sensor, a hall effect sensor or hinge rotation sensor, light sensors, color sensors, IR cameras, accelerometer, gyroscope, orientation sensor, or geographic position sensors), via the sensor drivers 531, as described in greater detail with respect to FIG. 2. In still another example of the multimedia processing control API 576 facilitating communication with the intelligent videoframe privacy monitoring management system 570 the multimedia processing control API 576 may receive default media capture instructions, default AV processing instruction module settings, or captured audio samples from a streaming media driver 525, as described in greater detail with respect to FIG. 2. In other embodiments, the multimedia processing control API 576 may receive default media capture instructions or default AV processing instruction module settings via direct communication with the multimedia framework pipeline and infrastructure platform 540.

The intelligent videoframe privacy monitoring management system 570 in an embodiment may also communicate directly with the MMCA 550 or indirectly via the multimedia processing control API 576 to gather meeting metrics describing user participation and performance of the MMCA 550 during a user videoconference session in which the information handling system 500 participates. The intelligent videoframe privacy monitoring management system 570 may receive one or more meeting metrics describing performance of the MMCA or context of participants during execution of a user videoconference session in an embodiment. In some embodiments, these meeting metrics may be gathered during routine out-of-band communications between the information handling system performance optimizer application 575 and the information handling system 500. Such meeting metrics may include, for example, a measure of the CPU resources consumed by the MMCA 550 over time, including at times intelligent videoframe privacy monitoring management system image alterations are conducted, if any. Other example meeting metrics may include a measure of memory resources consumed. Still other example meeting metrics may compare CPU or memory usage by the MMCA 550 to total CPU or memory used by all applications, hardware, or firmware during the training user videoconference session. Yet other example meeting metrics may indicate contextual information about participants to the user videoconference session, including, for example, email, title, location, or context of invitation and shared materials for a videoconference session.

Such meeting metrics may also describe the performance of media sample processing, transmission, and playback among a plurality of information handling systems (e.g., including 500) engaged in a single user videoconference session for the MMCA 550. For example, meeting metrics gathered by the intelligent videoframe privacy monitoring management system 570 during a training session may describe latency, or a measurement of time elapsing between a first information handling system (e.g., 500) transmitting the processed, encoded media sample and a second information handling system receiving the processed, encoded media sample. Meeting metrics may also include allocation of processing resources consumed during application of any AV processing modules used to execute optimized videoframe privacy adjustment instructions generated from a trained intelligent videoframe privacy monitoring management system neural network to apply elected alterations to captured videoframes when a videoconference interruption is detected. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA 550, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

In some embodiments, the intelligent videoframe privacy monitoring management system 570 may determine occurrence of videoconference interruption events and apply optimized videoframe privacy adjustments in response without necessarily utilizing a neural network. However, other embodiments herein involve the intelligent videoframe privacy monitoring management system 570 utilizing a neural network to determine the occurrence of videoconference interruption events, the context of the videoconference session, and application of optimized videoframe privacy adjustments in response. Upon training of a neural network unique to each information handling system (e.g., 500) with inputs gathered above, the neural network may be ready to assist in determining optimized videoframe privacy adjustment instructions for the information handling system for which it was trained, based on updated input values for later videoconferencing using the MMCA 550. In some embodiments, this determination may be made by the trained neural network operating at the intelligent videoframe privacy monitoring management system 570 located remotely from the information handling system 500. In other embodiments, the trained neural network for information handling system 500 may be transmitted from the intelligent videoframe privacy monitoring management system 570 at a remote location to an agent 571 thereof, operating at the information handling system 500 conducting a videoconference session.

The process described directly above for gathering some or all of the above inputs may use those inputs to train the optional neural network (e.g., via the multimedia processing control API 576) in an embodiment. Transmission of those inputs to the intelligent videoframe privacy monitoring management system 570 in an embodiment may be repeated, following training of the neural network to utilize the trained neural network in later videoconference sessions. As described in greater detail with respect to FIG. 8, the intelligent videoframe privacy monitoring management system 570, including the optional trained neural network in an embodiment, may determine optimized videoframe privacy adjustment instructions to make privacy alterations to captured videoframes, or optimized video capture setting adjustments. Some privacy alterations to captured videoframes may occur by invoking execution of those features of optimized AV processing instruction adjustments. In an embodiment, the intelligent videoframe privacy monitoring management system 570 may determine optimized AV processing instruction adjustment to optimize virtual background or blur settings, optimize boundary detection algorithm operation, to replace the captured videoframes with a stock image, or other privacy alterations in response to videoconference interruption detection. In still another embodiment, the intelligent videoframe privacy monitoring management system 570 may determine optimized media capture settings, optimized application prioritization instructions, or optimized multi-application display settings. Each of the optimized videoframe privacy adjustments output from the neural network may be transmitted to the multimedia processing control API 576 in an embodiment.

The multimedia processing control API 576 in an embodiment may transmit each of the optimized videoframe privacy adjustment instructions received from the intelligent videoframe privacy monitoring management system 570 to the application, controller, or driver at which such settings or instructions will be implemented. For example, the multimedia processing control API 576 may transmit optimized audio capture settings, optimized video capture settings, optimized multi-application display settings, or camera selection instructions to the streaming media driver 525. The streaming media driver 525 in an embodiment may direct the operation of the camera and the microphone such that media (e.g., images, video samples, audio samples) is captured according to the optimized media capture instructions according to embodiments herein. For example, the streaming media driver 525 in an embodiment may direct the camera to capture images and generate video samples having the frames per second, zoom settings, pan settings, or number of key frames defined by the optimized video capture instructions. As another example, the streaming media driver 525 in an embodiment may direct the microphone to capture and generate audio samples having the bitrate defined by the optimized audio capture instructions. As yet another example, the streaming media driver 525 in an embodiment may select one of a plurality of cameras to capture images and generate video samples, based on the camera selection instructions. In still another example, the streaming media driver 525 in an embodiment may direct the digital display to display graphical user interfaces for a plurality of applications such as to generate a user interface to provide for option settings to utilize the intelligent videoframe privacy monitoring management system in some embodiments.

In other embodiments, the multimedia processing control API 576 may transmit various optimized videoframe privacy adjustment instructions to the streaming media driver 525 or to the multimedia framework pipeline and infrastructure platform 540. For example, the multimedia processing control API 576 may transmit optimized media capture instructions (e.g., including optimized video capture instructions and optimized audio capture instructions) to the streaming media driver 525 or to the multimedia framework pipeline and infrastructure platform 540. As described herein, streaming media driver 525 may direct peripherally connected cameras or microphones to capture video and audio. The streaming media driver 525 in an embodiment may do so pursuant to instructions received from the multimedia framework pipeline and infrastructure platform 540. Thus, instructions for performing such capture of media samples (e.g., video or audio samples) in an embodiment may be stored at or executed by one or more of the multimedia framework pipeline and infrastructure platform 540 or the streaming media driver 525.

In another aspect of an embodiment, the multimedia framework pipeline and infrastructure platform 540 in an embodiment may include an AV processing instruction manager 541 directing the video processing engine 580 or audio processing engine 590 to perform various post-capture media processing methods (also referred to herein as AV processing instruction modules) on captured media samples (or on externally received media samples during a user videoconference session with the MMCA 550). Optimized AV processing instruction adjustments in an embodiment may direct the AV processing instruction manager 541 to include or exclude one or more specifically identified AV processing instruction modules in an embodiment to conduct, for example, privacy alterations to videoframes pursuant to optimized videoframe privacy adjustment instructions generated by the intelligent videoframe privacy monitoring management system 570.

Further, optimized offload setting adjustments, such as for optimized AV processing instruction modules (which may include optimized virtual background and blur settings, and optimized boundary detection algorithm instructions, others) may direct the ways in which the AV processing instruction manager 541 directs execution of such AV processing instruction modules in an embodiment. For example, optimized offload setting adjustments may cause the AV processing instruction manager 541 to execute AV processing instruction modules specifically identified within the optimized offload settings using one of a plurality of processors (e.g., CPU, GPU, VPU, GNA) specifically associated with that AV processing instruction within the optimized offload setting adjustments. As another example, the AV processing instruction manager 541 may direct one or more modules within the video processing engine 580 to apply a virtual background or blur to a background as specifically identified within the optimized virtual background or blur settings. Through determination and delivery of each of these optimized settings to the information handling system 500 to execute optimized videoframe privacy adjustment instructions, the intelligent videoframe privacy monitoring management system 570 in an embodiment may optimize capture of media samples and post-capture processing of those samples to balance CPU load (and other processor loads) of the information handling system 500 with quality of user experience when engaged in a user videoconference session.

Figure 6:
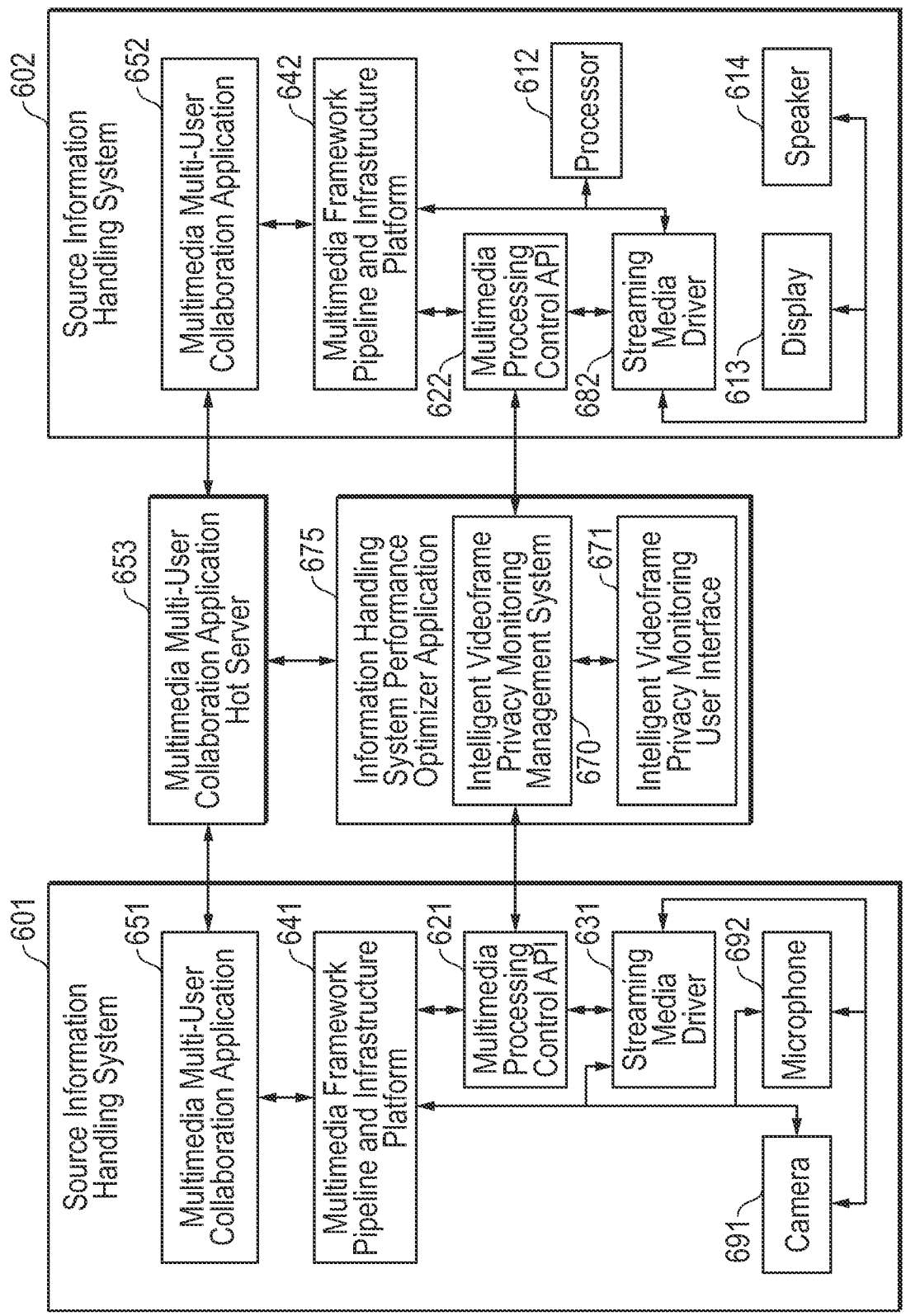
FIG. 6 is a block diagram illustrating a second embodiment of an intelligent videoframe privacy monitoring management system for optimizing information handling system usage of a multimedia, multi-user collaboration application according to an embodiment of the present disclosure.

FIG. 6 is a block diagram illustrating another embodiment of an intelligent videoframe privacy monitoring management system for coordinating processing of media samples across a plurality of information handling systems that are each participating in the same user videoconference session of a MMCA according to an embodiment of the present disclosure. User videoconference sessions may be hosted and coordinated by a MMCA host server 653 located remotely from, but in communication with one or more source information handling systems (e.g., 601) and one or more sink information handling systems (e.g., 602) via a network. It is understood that information handling system 601 and information handling system 602, as well as any other information handling systems participating within the user videoconference session hosted by the MMCA host server 653 may operate as a media source, a media sink, or both.

The intelligent videoframe privacy monitoring management system 670, or separate agents thereof operating at the source information handling system 601 and sink information handling system 602, respectively, may make determinations of occurrence of a videoframe interruptions and optimized videoframe privacy adjustments based on metrics specific to a single user videoconference session for the MMCA in which both the source information handling system 601 and the sink information handling system 602 are engaged. The MMCA 651 and MMCA 652 in an embodiment may operate through a shared network via a MMCA host server 653 to control engagement in videoconference systems.

The MMCA host server 653 in an embodiment may comprise a plurality of servers executing software for recording metrics for each hosted user videoconference session. Such recorded user videoconference session metrics in an embodiment may describe, for example, the number of participants in the user videoconference session, features of the MMCA that are enabled for each participant, or the like. The additional user videoconference session metrics for a session in which the source information handling system 601 or sink information handling 602 participate may be gathered by the MMCA host server 653, and transmitted to the MMCA 651 and MMCA 652 for input into the neural network of the intelligent videoframe privacy monitoring management system 670 in some embodiments.

As described herein, for example in an embodiment described with reference to FIG. 5, the intelligent videoframe privacy monitoring management system 670 may transmit optimized videoframe privacy adjustment instructions to the multimedia processing control API (e.g., 621 or 622), optionally based on outputs from the trained neural networks in an embodiment, for each respective information handling system (e.g., 601, or 602). In an embodiment shown in FIG. 6, in which the intelligent videoframe privacy monitoring management system 670 operates within the information handling system performance optimizer application 675, remotely from either the source information handling system 601 or the sink information handling system 602. In other embodiments, the intelligent videoframe privacy monitoring management system 570 may operate in whole or in part locally at information handling system 601 or 602.

The intelligent videoframe privacy monitoring management system 670 in an embodiment may transmit the optimized videoframe privacy adjustment instructions to the multimedia processing control API 621. For example, the multimedia processing control API 621 may direct the optimized videoframe privacy adjustment instructions to systems or software in the source information handling system 601 to generate privacy alterations by directing AV processing instruction modules such as those described herein to conduct alteration to captured videoframe data according to various embodiments. In other embodiments, the intelligent videoframe privacy monitoring management system 670 may similarly determine other such optimized videoframe privacy adjustment instructions for the sink information handling system 602. The intelligent videoframe privacy monitoring management system 670 in such an embodiment may transmit the optimized videoframe privacy adjustment instructions to the multimedia processing control API 622, for example. Both may use input metrics from the MMCA host server 653.

Optimized videoframe privacy adjustment instructions transmitted to the multimedia processing control API 621 of the source information handling system 601 in an embodiment may include, for example, optimized audio capture settings, optimized video capture settings, or optimized AV processing instruction adjustments as described in embodiments herein. The multimedia processing control API 621 in such an embodiment may transmit these optimized settings to the streaming media driver 631. The streaming media driver 631 in such an embodiment may direct the camera 691 to capture video samples according to the optimized video capture settings and direct the microphone 692 to capture audio samples according to the optimized audio capture settings. As another example embodiment, the streaming media driver 631 in an embodiment may select one of a plurality of cameras (e.g., camera 691) to capture images and generate video samples, based on the camera media capture instructions. In some embodiments, the optimized audio capture settings or optimized video capture settings may be transmitted from the multimedia processing control API 621 to the multimedia framework pipeline and infrastructure platform 641 instead. Similar utilization of optimized videoframe privacy adjustment instructions may be transmitted to the multimedia processing control API 622 of the sink information handling system 602 and may also apply any intelligent videoframe privacy monitoring and adjustment at 602.

Optimized videoframe privacy adjustment instructions output by a first neural network trained for source information handling system 601 and transmitted to the multimedia processing control API 621 in an embodiment may also include, for example, optimized processing features for enablement on the transmission side. Such optimized processing features pursuant to the optimized videoframe privacy adjustment instructions may include applying optimized virtual background or blur settings, applying optimized boundary detection algorithm instructions, replacing captured videoframes with a stock image, muting microphone audio data capture, or other optimized videoframe privacy adjustments according to various embodiments herein. The intelligent videoframe privacy monitoring management system 670 in an embodiment may transmit one or more of these optimized features for enablement pursuant to the optimized videoframe privacy adjustment instructions to the multimedia framework pipeline and infrastructure platform 641.

As described in greater detail with reference to FIGS. 3-4, the AV processing instruction manager of the multimedia framework pipeline and infrastructure platform 641 in an embodiment may execute one or more AV processing instruction modules on video samples received from the camera 691 via the streaming media driver 631, and audio samples received from the microphone 692 via the streaming media driver 631. The AV processing instruction modules executed by the multimedia framework pipeline and infrastructure platform 641 in such an embodiment may be selected or enabled based on the optimized videoframe privacy adjustment instructions for enablement on the transmission side, optimized virtual collaboration application features for enablement, or optimized AV processing instruction adjustments. Further, the algorithms or methods employed during execution of each of these AV processing instruction modules, and the processor executing such algorithms, may be chosen based on any optimized offload setting adjustments and the AV processing instruction modules utilized pursuant to the optimized videoframe privacy adjustment instructions. For example, AV processing instruction adjustments in an embodiment may further identify a specific type of encoding algorithm that requires lower computing overhead. These optimized settings and instructions may decrease the load on the CPU of the source information handling system 601 during such post-capture processing.

The load on the CPU of the source information handling system 601 during execution of these post-capture media processing methods may also be decreased as a consequence of the methods used to perform such captures. For example, by capturing the video samples using optimized video capture instructions and capturing the audio samples using optimized audio capture instructions, the richness of data within the captured video and audio samples may decrease in some embodiments, causing another decrease in the amount of processing power required for the algorithms associated with various AV processing instruction modules to be performed on these samples. Additionally, the load on the CPU of the source information handling system 601 in an embodiment may be further decreased by directing the AV processing instruction manager of the multimedia framework pipeline and infrastructure platform 641 to engage processors (e.g., GPU, VPU, GNA) other than the CPU of the source information handling system 601 to execute various AV processing instruction modules. This may free up processing power for execution of other software applications (e.g., other than the MMCA 651) during a user videoconference session for the MMCA 651, and result in greater overall user experience.

By optimizing the post-capture media processing methods applied to the video samples and audio samples captured at the source information handling system 601 and potentially altered by the intelligent videoframe privacy monitoring management system 670 may also decrease the load on the CPU at the sink information handling system 602 during a user videoconference session shared between the MMCA 601 and the MMCA 652. As described in greater detail with reference to FIG. 4, the AV processing instruction manager of the multimedia framework pipeline and infrastructure platform (e.g., 641) at the source information handling system (e.g., 601) may perform several AV processing instruction modules on incoming audio and video samples, including encoding and multiplexing of these samples to form a processed, encoded media sample. In such an embodiment, the processed, encoded media sample may be then be forwarded to the MMCA 651 for transmission (e.g., via a network) to the MMCA 652 at the sink information handling system 602.

The multimedia framework pipeline and infrastructure platform 642 at an information handling system operating as a media sink in an embodiment may retrieve the remotely captured, media sample that was processed and encoded at a source information handling system (e.g., 601). The remotely captured media sample may include audio and video captured at the source information handling system 601 from the MMCA 652. In such an embodiment, the multimedia framework pipeline and infrastructure platform 642 may perform one or more AV processing instruction modules on the processed and encoded media sample, including demultiplexing and decoding of the media sample into formats compatible with the display 613 and speakers 614 of the sink information handling system 602. For example, a multiplexing module of the multimedia framework pipeline and infrastructure platform 642 may demultiplex or split the processed and encoded media sample captured at the source information handling system 601 into an encoded video sample and an encoded audio sample. As another example, a video compression module of the multimedia framework pipeline and infrastructure platform 642 may decode or decompress the demultiplexed video sample into a format that may be transmitted via the streaming media driver 682 to a digital display 613 for playback. As yet another example, an audio compression module of the multimedia framework pipeline and infrastructure platform 642 may decode or decompress the demultiplexed audio sample into a format that may be transmitted via the streaming media driver 682 to a peripherally attached speaker 614 for playback.

The video sample demultiplexed and decoded from the processed and encoded media sample retrieved from the MMCA 652 in an embodiment may be transmitted to the streaming media driver 682 for playback of the video via the digital display 613 of the information handling system 602. In another aspect of such an embodiment, the audio sample demultiplexed and decoded from the processed and encoded media sample retrieved from the MMCA 652 may be transmitted to the streaming media driver 682 for playback of the audio via an operably connected speaker 614 of the information handling system 602.

Figure 7:
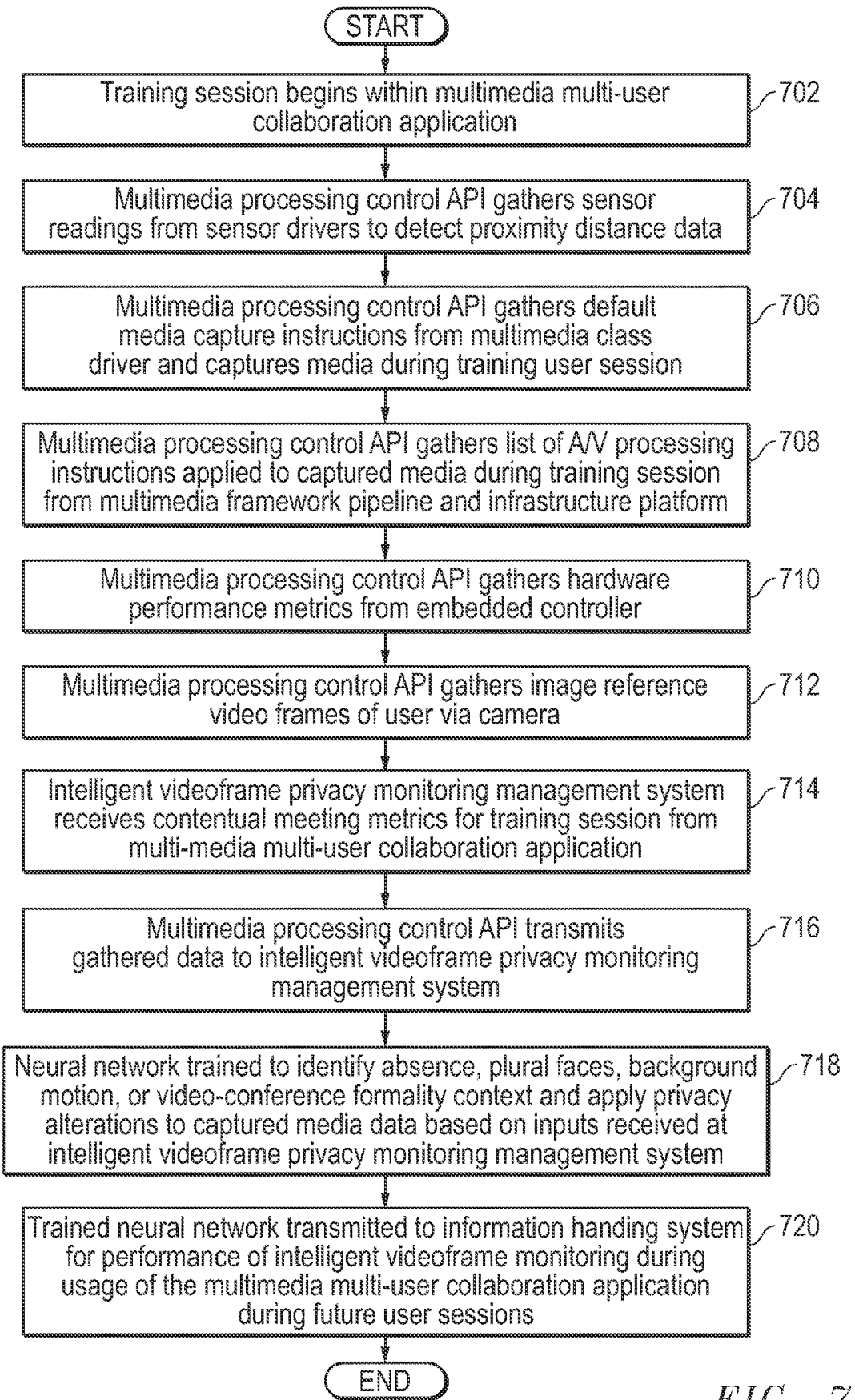
FIG. 7 is a flow diagram illustrating a method of training a neural network to intelligently monitor and adjust videoframe privacy during usage of a multimedia multi-user collaboration application of an information handling system according to an embodiment of the present disclosure.

FIG. 7 is a flow diagram illustrating a method of training a neural network for embodiments when one is used with the intelligent videoframe privacy monitoring management system to identify user videoconference interruptions in captured videoframes, to determine formal or casual context of videoconference sessions or the videoconference interruptions, and to output optimized videoframe privacy adjustment instructions. In some embodiments of the present disclosure, detection of videoconference interruptions may be conducted without a neural network by the intelligent videoframe privacy monitoring management system software. In those embodiments, the intelligent videoframe privacy monitoring management system may determine certain videoconference interruptions based on TOF sensor data and determination of distances of a user, other users or objects, and background elements in front of a video camera system during videoframe capture. Additionally, the TOF sensor data may be used with a user presence detection (UPD) software system to detect absence presence of a user or detect plural faces present in some embodiments. In other embodiments, unusual motion detection (UMD) software system may be executed to assess multiple videoframes with TOF sensor data to detect motion such as background motion in captured videoframes.

However, other embodiments of the present disclosure also contemplate utilization of training a neural network to determine videoconference interruptions, and that determination may have added context. For example, a neural network may be trained to use the distance data detection as well as a face recognition neural network to detect user absence or presence as well as identify the user as being the one present or absence, for example in the case of a user who leaves a videoconference and someone returns to their screen. Similarly, the neural network may be trained to use facial recognition or other inputs for context of detected plural faces. For example, identification of invited participants to a videoconference may determine if a videoconference is casual and, thus, no privacy alterations to videoframes are necessary with plural faces detected. It may be that having plural faces participate in the videoconference session may be desired in a casual setting. Additionally, if privacy alterations are desired, a neural network may be trained to identify faces and their identity to determine if the alterations should be applied or where to apply a blur or other alteration. Thus, the intelligent videoframe privacy monitoring management system may output optimized videoframe privacy adjustments based on TOF distance data sensor detection or may access a neural network in various contexts.

In an embodiment where the neural network is trained to identify videoconference interruptions or additional context to videoconference interruptions, as well as any determined output optimized videoframe privacy adjustment instructions, one or more training user videoconference sessions may be conducted to train a neural network to be used by the intelligent videoframe privacy monitoring management system according to an embodiment of the present disclosure. Further, ongoing training updates may be conducted similarly according to the embodiments of FIG. 7 to further refine and update the neural network of the intelligent videoframe privacy monitoring management system as understood by those of skill.

The intelligent videoframe privacy monitoring management system in an embodiment may gather input variables including sensor-derived distance data of a user, other persons or objects, and background elements in front of a video camera. Additional gathered inputs may include captured video frames with captured images of a user that may be used as reference images for use in training a neural network. Additional input variables that may be gathered include those describing media capture settings for capturing audio and video samples during such a training user videoconference session, a list of AV processing instruction modules performed on these captured media samples, and the processors that executed these AV processing instruction modules in some embodiments. These input variables may be gathered for a plurality of training sessions in which an information handling system and user participates, in order to tailor the neural network to optimize intelligent monitoring of videoframe privacy in captured videoframes by the MMCA as a videoconference session is executed at that specific information handling system in an embodiment. By comparing distance data, several different captured images of a user or others, and casual versus formal contextual inputs to criteria of determining user videoconference interruptions, the neural network may learn to identify user videoconference interruptions or to add context to identification of videoconference interruptions. Then the intelligent videoframe privacy monitoring management system may generate optimized videoframe privacy adjustment instructions to determine when to add privacy alterations to captured videoframes.

At block 702, a training user videoconference session may begin within the MMCA in an embodiment. For example, in an embodiment described with reference to FIG. 6, a source information handling system 601 and a sink information handling system 602 may both join a single user videoconference session of the MMCA (e.g., 651 and 652) via a central, networked MMCA host server 653, an agent of which may be operating at both the source information handling system 601 and the sink information handling system 602. It is understood that each information handling system 601 and 602 may function as a media source and as a media sink. After such training user videoconference sessions have been completed, the intelligent videoframe privacy monitoring management system in an embodiment may identify user videoconference interruptions including identity of a user and contextual information about formal versus casual nature of the videoconference. With these various inputs to the neural network, the intelligent videoframe privacy monitoring management system may detect some level of contextual detail about videoconference interruptions, and generate optimized videoframe privacy adjustment instructions to apply optimized AV processing instruction adjustments or other instructions apply videoframe privacy alterations to captured videoframes. A plurality of training user videoconference sessions may be completed in an embodiment prior to conclusion of the training phase for the neural network of the intelligent videoframe privacy monitoring management system.

The multimedia processing control API may gather sensor readings from sensor drivers at block 704 in an embodiment. For example, in an embodiment described with reference to FIG. 2, various sensor readings may be taken by the information handling system 200 and communicated to the intelligent videoframe privacy monitoring management system. More specifically, the information handling system 200 may include one or more sensors within a sensor array 230 as described in various embodiments herein. In particular, a TOF sensor or other proximity sensor may be used with a UPD software system to determine distance data relative to a user, other persons or objects, and background elements in front of a video camera capturing videoframes in an embodiment. Additional sensor data, such as GPS or other location data may be captured to assist with formal or casual context determination of the videoconference sessions. All sensor readings from sensors within the sensor array 230 in an embodiment may be transmitted to the sensor drivers 231. The multimedia processing control API 574 may forward various sensor readings to the intelligent videoframe privacy monitoring management system 570 for training the neural network described herein.

The multimedia processing control API may gather default media capture instructions from a streaming media driver in an embodiment at block 706 where relevant in some embodiments. For example, in an embodiment described with reference to FIG. 2, default media capture instructions and default AV processing instruction module settings may be gathered via a streaming media driver 225 and transmitted to the intelligent videoframe privacy monitoring management system. Default media capture instructions in an embodiment may be generated by the MMCA, or may be preset by the manufacturer of the camera, microphone, or information handling system 200. In another example embodiment described with reference to FIG. 5, the multimedia processing control API 576 may receive default media capture instructions from the streaming media driver 525.

Such default media capture instructions and optimized media capture instructions may dictate the method by which such audio, image, and video samples are captured. For example, in an embodiment described with reference to FIG. 2, media capture instructions may identify whether a camera is on or off, the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify whether ra microphone is on or muted, or the bit rate at which the microphone 224 records and saves captured audio samples. Media capture instructions may be adjusted, for example in some embodiments, by the neural network as optimized videoframe privacy adjustment instructions to apply or assist with videoframe alterations in captured videoframes in response to identified user videoconference interruptions.

At block 708, the multimedia processing control API may gather a list of AV processing instruction modules applied to captured media during a training session from the multimedia framework pipeline and infrastructure platform in an embodiment. For example, in an embodiment described with reference to FIG. 2, a list of available AV processing instruction modules may be gathered via the streaming media driver 225 and transmitted to the intelligent videoframe privacy monitoring management system. In another example embodiment described with reference to FIG. 5, the multimedia processing control API 576 may receive default AV processing instruction module settings from the streaming media driver 525. In other embodiments, the multimedia processing control API 576 may receive default AV processing instruction module settings for how post-processing is conducted on videoframes via direct communication with the multimedia framework pipeline and infrastructure platform 540.

As described in various embodiments herein, the AV processing instruction modules may be applied to captured videoframes upon detection of user videoconference interruptions. The AV processing instruction modules may also be applied to captured videoframes to apply videoframe privacy measures, or adjusted in their operation by the neural network by optimized videoframe privacy adjustment instructions. The AV processing instruction modules to apply privacy alterations in captured videoframes in response to identified user videoconference interruptions may be generated in view of active or available AV processing instruction modules in some embodiments. For example, application of virtual background may be a selected options by a user and an optimized videoframe privacy adjustment instruction to apply a virtual background or to utilize a stock image or blur in response to detecting a videoconference interruption may conflict or not be necessary. Such data about AV processing instruction modules may be also input to train the neural network.

At block 710, the multimedia processing control API may gather hardware performance metrics from an embedded controller if applicable in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current offload instruction) may be determined by the embedded controller 504 in kernel mode and communicated to the information handling system performance optimizer application 575 directly during routine out-of-band communications between the information handling system performance optimizer application 575 and all managed information handling systems (e.g., including 500).

At block 712, the processing control API may gather from the video camera of the information handling system one or more captured videoframes that may include images of a user, images of other persons, objects, or background elements during a videoconference session with the MMCA. For example, usage of image recognition algorithms may be employed via neural network in analysis of captured user images, other person facial images, or identification of objects (e.g., pets) in videoframes to identify videoconference interruptions and provide context to them in the captured videoframes in some embodiments. These captured videoframes may be used as input to train the neural network as reference images of a user's, other persons or objects, or background elements within captured videoframes. A plurality of such images of the user, images of other persons, objects, or background elements, in multiple captured videoframes may be used to generate an image recognition level set of parameters relating to the appearance of the user in videoframes in some example embodiments. Such captured image frames used by the neural network may operate as a form of reference image to determine both what is typical in the captured videoframes and what may be identified as potentially unusual as a videoconference interruption. In embodiments herein, plural captured videoframes may be gathered to train the neural network with a greater number of videoframes providing increased reference context for what is typical in the captured videoframes and what may be identified as potentially unusual as a videoconference interruption in captured videoframes to train the neural network. Similarly, greater number of captured videoframes may improve facial or object recognition for context of detected videoconference interruptions in training the neural network.

At block 714, the intelligent videoframe privacy monitoring management system in an embodiment may receive meeting metrics for the training session from the MMCA. For example, the intelligent videoframe privacy monitoring management system may gather meeting metrics at 714 describing contextual information about invited participants to a videoconference, location of the information handling system, or other contextual factors about the formality context level of the videoconference session during such training in an example embodiment. For example, emails or titles of videoconference participants, locations, videoconference invitation details such as title, or shared collaboration documents or materials may indicate whether a videoconference is populated by business associates or family and friends. In still other examples, contextual meeting metrics may be gathered by the MMCA host server 653, and may describe the number of users, whether or which users are screensharing, which users are using virtual backgrounds, which users are muted, and which participants are hosting, among other descriptions of participation among a plurality of users in a single videoconference session.

The intelligent videoframe privacy monitoring management system may further gather meeting metrics describing performance of the MMCA during such training user videoconference sessions at block 714. Some meeting metrics gathered by the intelligent videoframe privacy monitoring management system during a training session may describe latency, or a measurement of time elapsing between a first information handling system transmitting the processed, encoded media sample and a second information handling system receiving the processed, encoded media sample. Such meeting metrics may include, for example, a measure of the CPU, GPU, and other processing resources consumed by the MMCA over time, during the training user videoconference session. Other example meeting metrics may include a measure of memory resources consumed. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

The multimedia processing control API in an embodiment may transmit the data gathered at steps 704-714 to the intelligent videoframe privacy monitoring management system in an embodiment at block 716. By gathering this data, and transmitting it to the intelligent videoframe privacy monitoring management system in an embodiment, the multimedia processing control API may operate as a hub. For example, in an embodiment described with reference to FIG. 5, the multimedia processing control API 574 may forward default media capture instructions, default AV processing instruction module settings, captured audio samples, captured video samples, and various sensor readings to the intelligent videoframe privacy monitoring management system 570 for determination of use appearance anomalies and optimized remediating image adjustment using the neural network described herein. A neural network of the intelligent videoframe privacy monitoring management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704-714. Upon training of such a neural network unique to each information handling system (e.g., 500), the neural network may be ready to determine videoconference adjustments and optimized videoframe privacy adjustments for the information handling system for which it was trained (e.g., as described in greater detail with respect to block 718), based on updated input values.

A neural network may be trained in an embodiment to model the relationship between identification of videoframe interruptions such as user presence or absence, plural faces, or background motion in captured videoframes by the MMCA, and context of those videoframe interruption events with potential application of videoframe privacy alterations based on all inputs received at the intelligent videoframe privacy monitoring management system at block 718. The intelligent videoframe privacy monitoring management system may input some or all of the values gathered from the multimedia processing control API and the MMCA into a multi-layered, feed-forward, machine-learning neural network to train the neural network to model the relationship between one or more of the input values. Some or all input values such as reference user images from videoframes gathered, identification of sensor distance data, and identification of one or more contextual meeting metric inputs, and available privacy alterations to videoframes via AV processing instruction modules among others may be used. For example, the neural network may correlate rounds of captured videoframes including a user or other person or object images with certain captured reference videoframes including user or other person or object images to determine both person or persons present or absent as well as context of who or what is present. Additionally, the neural network may correlate rounds of captured videoframes with identification of one or more videoframe interruptions and whether privacy alterations should be initiated based on context or existing AV processing modules operating for a user videoconference session in some embodiments.

The intelligent videoframe privacy monitoring management system in an embodiment may model a multi-layered, feed-forward, machine-learning classifier neural network in an embodiment, for example, convolutional neural network such as a deep-learning 4 (DL4) neural network. In other embodiments, the neural network in an embodiment may comprise a multi-layer perceptron (MLP) classifier neural network. Several such multi-layered feed-forward, machine-learning classifier neural networks exist in the art, and any of these networks may be chosen to model this relationship of the captured videoframes to an identify recognition in a user's, person's or object's image, and identification of various videoconference interruptions or the context of those interruptions. The neural networks may also be chosen to model the relationship of various videoconference interruptions to formal or casual context of the videoconference as well as whether to apply optimized videoframe privacy adjustment instructions for videoframe privacy alterations in captured videoframes via adjustment to media capture settings, AV processing instruction adjustments or others. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network. These are only a few example multi-layer neural networking types that may be implemented in embodiments herein.

The neural network may include a plurality of layers, including an input layer, one or more hidden layers, and an output layer. The setting selections for intelligent videoframe privacy monitoring received from a user interface as well as captured reference videoframes, distance data of persons or objects, contextual meeting metrics, and other inputs gathered at blocks 704-714 may form the input layer of the neural network in an embodiment. These input layers may be forward propagated through the neural network to produce an initial output layer that includes predicted identification of videoconference interruptions and contexts for when to apply optimized videoframe privacy adjustments or which optimized videoframe privacy adjustments to apply based on context in some example embodiments.

Actual or known values for several gathered inputs in the captured videoframes including user reference images may be used to train the neural network. Other actual or known values may include criteria for identification of a user or other images of persons or objects in video frames as well as identification of formal versus casual labels for video-conference session from contextual meeting metrics. Each of the output nodes within the output layer in an embodiment may be compared against such known values to generate an error function for each of the output nodes. This error function may then be back propagated through the neural network to adjust the weights of each layer of the neural network.

The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for the captured videoframes with reference images of a user, other persons or objects and other inputs to identify the user, other persons or objects with image recognition. Similarly, the weights of the layers of the neural network may be serially adjusted until the output node for the captured videoframes, proximity distance data, and other inputs to determine that a videoconference interruption has occurred and context of who or what is involved in an embodiment. In another embodiment, the weights of the layers of the neural network may be serially adjusted until the output node for the captured videoframes, contextual meeting metrics relating to participant identity or purpose of the videoconference session, and other inputs to determine whether a videoconference session is in a formal/professional context or a casual context and whether to apply an optimized videoframe privacy adjustment upon detection of a videoconference interruption.

The weights of the layers of the neural network may be adjusted until the identification of particular types of videoconference interruptions is accurately predicted based on the known values of user appearance anomalies, based on known values. In such a way, the neural network may be trained to provide the most accurate output layer, including a prediction of an identity of user, other persons or objects in captured videoframes in an embodiment, In another embodiment, refined output layers outputs may predict detection of an identified videoconference interruption determined from distance data from proximity sensing systems and determined with a user presence detection system or an unusual movement detection system occurring before the video camera system or within captured videoframes. Yet other refined output layer outputs may include predicted identification of videoconference interruptions and contexts of the videoconference as formal or casual and predicting when to apply optimized videoframe privacy adjustments or which optimized videoframe privacy adjustments to apply. Additionally, the layers of the neural networks may be serially adjusted to refine these outputs further. In such a way, the neural network may be trained to provide the most accurate output layer, including a prediction of identification of videoconference interruptions and contexts for when to apply optimized videoframe privacy adjustments or which optimized videoframe privacy adjustments to apply based on the determined videoconference context in some example embodiments.

At block 720, the intelligent videoframe privacy monitoring management system in an embodiment may transmit the trained neural network to the information handling system for which it has been trained for intelligent videoframe privacy monitoring during future user videoconference sessions. For example, in an embodiment described with respect to FIG. 5, upon training of the neural network unique to each information handling system (e.g., 500), the neural network may be ready to determine optimized videoframe privacy adjustments conducted on the information handling system for which it was trained, based on updated input values gathered during later videoconference sessions. In some embodiments, this determination may be made by the trained neural network operating at the intelligent videoframe privacy monitoring management system 570, located remotely from the information handling system 500. In other embodiments, the trained neural network for information handling system 500 may be transmitted from the intelligent videoframe privacy monitoring management system 570 to an agent 571 thereof, operating at the information handling system 500. The method for training the neural network in an embodiment may then end.

Figure 8:
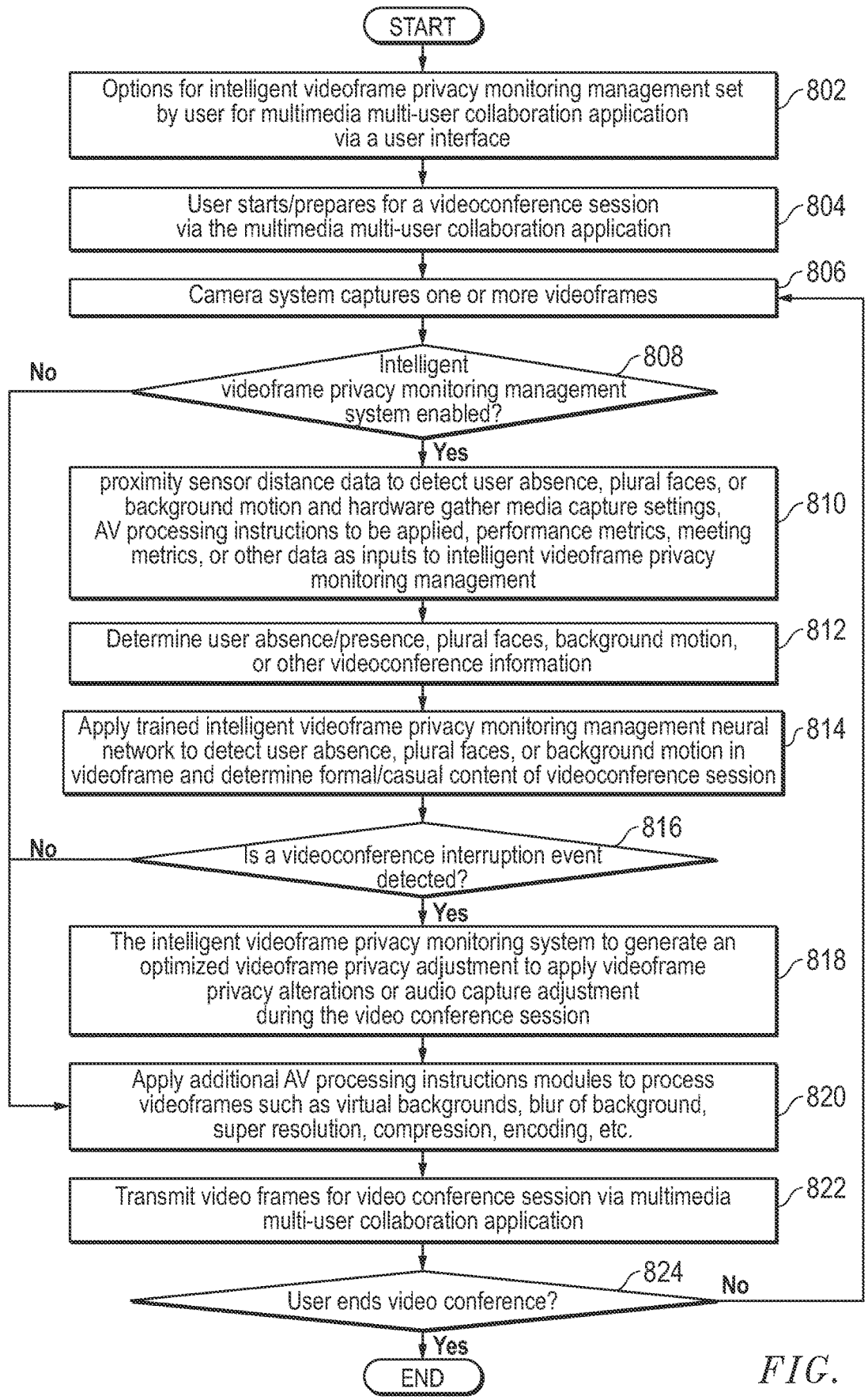
FIG. 8 is a flow diagram illustrating a method to intelligently monitor and adjust videoframe privacy during usage of an information handling system for a videoconferencing session according to an embodiment of the present disclosure.

FIG. 8 is a flow diagram illustrating a method of executing an intelligent videoframe privacy monitoring management system according to an embodiment of the present disclosure. As described above and in some embodiments of the present disclosure, the detection of videoconference interruptions may be conducted without a neural network by the intelligent videoframe privacy monitoring management system software. In those embodiments, the intelligent videoframe privacy monitoring management system may determine certain videoconference interruption events based on proximity sensor data and determination of distances of a user, other persons or objects, or background elements in front of a video camera system during videoframe capture. Additionally, the proximity sensor data may be used with a user presence detection (UPD) software system to detect absence or presence of a user or detect plural faces present in some embodiments. In other embodiments, an unusual motion detection (UMD) software system may be executed to assess multiple videoframes with proximity sensor distance data to detect motion such as background motion in captured videoframes.

However, other embodiments of the present disclosure also contemplate utilization of training a neural network to determine videoconference interruption events, and that determination may include added context in some aspects as described herein. For example, a neural network may be trained to use proximity distance data detected with a face recognition neural network to detect user absence or presence as well as identify the user as being the one present or absence. For example, a user may leave a videoconference, and then someone returns to their screen. Similarly, the neural network may be trained to use facial recognition or other inputs for context of detected plural faces. For example, identification of invited participants to a videoconference may determine if a videoconference is casual and, thus, no privacy alterations to videoframes are necessary with plural faces detected. It may be that having plural faces participate in the videoconference session may be desired in a casual setting. Additionally, if privacy alterations are desired, a neural network may be trained to identify faces and their identity to determine if the alterations should be applied or where to apply a blur or other alteration. Thus, the intelligent videoframe privacy monitoring management system may output optimized videoframe privacy adjustments based on processing proximity sensor distance data, on output from a trained neural network, or on a combination in various embodiments.

Starting at block 802, the intelligent videoframe privacy monitoring management system may obtain control setting options indicating a selection by a user to utilize the intelligent videoframe privacy monitoring management system service. Such a service may be provided, in whole or in part, via a remotely-located information handling system optimizer application, or may be available, in any portion, at the user's information handling system as described herein. In an embodiment, the information handling system optimizer application or the local information handling system may generate a user interface for the intelligent videoframe privacy monitoring management system presented to the user with selections for activating the software service. Such a user interface with selection options for a user are shown in block 802 for receiving initial settings, however it is understood that such a user interface to turn on or off to intelligent videoframe privacy monitoring management system or to adjust any options may be presented to a user at any time before or during a videoconference session.

In some embodiments, the intelligent videoframe privacy monitoring management system user interface may provide for more specific settings selectable by a user. For example, the intelligent videoframe privacy monitoring management system user interface may offer selection by a user to set what types of videoconference interruptions (e.g., user absence, plural faces, or background motion) to monitor for during videoconference sessions. In another embodiment, the intelligent videoframe privacy monitoring management system user interface may offer selection by a user to set what type of videoframe privacy alteration is desired in response to detected videoconference interruptions. Example videoframe privacy alterations provided by optimized videoframe privacy adjustments include applying a virtual background, blur, stock image, mute a microphone, or applying another privacy measure according to various embodiments of the present disclosure. In an example embodiment where the intelligent videoframe privacy monitoring management system does not implement a neural network, such user selection settings may be applied by the intelligent videoframe privacy monitoring management system and to any AV processing instruction modules. In another embodiment, such user selection settings may also be provided as inputs to a trained intelligent videoframe privacy monitoring management system neural network that may further assist in detecting videoconference interruptions and determining context of those videoconference interruptions or whether and which optimized videoframe privacy adjustments to initiate in the videoframes.

At block 804, a plurality of information handling systems may join a user videoconference session within the MMCA in an embodiment. One or more of the participant information handling systems may use an intelligent videoframe privacy monitoring management system, and which may optionally utilize a trained neural networks that have been trained for users of those information handling system. For example, in an embodiment described with reference to FIG. 6, a source information handling system 601 and a sink information handling system 602 may both join a videoconference user videoconference session via the MMCA host server 653. The user videoconference session joined at block 804 may be joined by any number of information handling systems. The MMCA may manage authenticating one or more invited participants, establishing communication and data links between participants, enabling features of the videoconference such as document sharing, and similar operations of the MMCA.

Proceeding to block 806, during the user videoconference session, a participating information handling system that joined the videoconference user videoconference session may initially capture media samples, including videoframes via video camera system. In one embodiment, the capture of videoframes may be conducted before the videoconference session begins, for example, as the user logs in. In other embodiments, videoframes may be gathered during the videoconference session or upon the user activating the video camera during the session. These captured videoframes may be taken according to default media capture instructions or most recent media capture settings for the video camera in some embodiments.

At block 808, the intelligent videoframe privacy monitoring management system at a remote location or operating at an agent on the user's information handling system may determine whether the intelligent videoframe privacy monitoring management system is activated for the videoconference session. For example, the intelligent videoframe privacy monitoring management system may determine whether the intelligent videoframe privacy monitoring management system user interface was used to enable intelligent appearance monitoring and what types of monitoring, notice, or adjustments have been set. If the intelligent videoframe privacy monitoring management system has been enabled to intelligently monitor user appearance, then flow may proceed to block 810 with gathering sensor inputs, such as TOF sensor or other proximity sensor data, and additional inputs that may be used for the intelligent videoframe privacy monitoring management system, and any optional neural network if a neural network is implemented. If the intelligent videoframe privacy monitoring management system has not been enabled, then flow may proceed to block 820 to conduct any AV processing of captured videoframes as well as other AV data to conduct a videoconference session via the MMCA as would otherwise operate without intelligent videoframe privacy monitoring or adjustments.

The intelligent videoframe privacy monitoring management system in an embodiment may gather sensor inputs and other inputs for the intelligent videoframe privacy monitoring management system from the multimedia processing control API and MMCA at block 810. For example, the intelligent videoframe privacy monitoring management system in an embodiment may acquire inputs similar to the method described with reference to blocks 704-716 above in FIG. 7.

At block 810, the method may proceed with gathering sensor inputs, such as TOF sensor or other proximity sensor data, or additional inputs for use with intelligent videoframe privacy monitoring management system for determining videoconference interruptions by detecting proximity distance data for a user, other persons or objects, or background elements in front of a camera in an embodiment. Other sensor data may be gathered as well in various embodiments. Gathered sensor inputs may be sensor data from a sensor hubs and a multimedia processing control API 621 or 622 of each of the participating information handling systems (e.g., 601 and 602). According to embodiments herein, a proximity sensor (or other camera) detection may detect distance data between a camera system and a user, other persons or objects, or background elements before the camera system in an embodiment. In an embodiment, a TOF sensor may be used. Any TOF sensor may be used and may include laser, visual spectrum, near infrared (IR), or IR spectrum camera TOF sensors to determine distance data of a user, an object, or other background elements based on time for light from a light source in a known location to bounce off of a person or object and be sensed by a camera sensor such as a charge coupled device (CCD). The TOF sensor 248 may have a light source and CCD or other camera sensor located in a known position relative to the camera system used to capture videoframes according to an example embodiment. Determination of distances in a space in front of the camera system may be conducted via scanning such as with a light detection and ranging (LIDAR) system in one example embodiment. Further, in an embodiment, this distance data may be input into a user presence detection (UPD) software module which may correlate the scanned distance data with locations within a videoframe, and determine from that information the location and distance of a user, persons or objects, or background elements appearing in the videoframe. This data may then be used by the intelligent videoframe privacy monitoring management system to determine a user, or other persons or objects are present in the videoframe relative to a background, and may detect plural faces and their distances in some embodiments. This proximity sensor distance data may be used by the intelligent videoframe privacy monitoring management system to determine that a videoconference interruption has occurred, such as a detected absence of a user in an embodiment as below in block 716. In another embodiment, this distance data may be used by intelligent videoframe privacy monitoring management system to determine that a plurality of faces appear before the video camera, how many faces, and the relative distance of the plural faces detected. Additional sensor information in an embodiment may include, for example, data from ambient light sensor, color sensors, or shading detectors which may assist in analysis of captured videoframes, an IR camera, or similar relevant sensor data.

In another embodiment, the UPD software module may determine distances of persons or objects across videoframes and an unusual movement detection (UMD) software module also may be implemented. The UMD software module may determine changes in distances across a plurality of sequential videoframes or movement within the images of the sequential videoframes to assess videoframe movement. In a particular embodiment, with the UPD software module identifying background from a user in a videoframe, movement or a person or object in the background portion of the videoframe may be detected. The intelligent videoframe privacy monitoring management system may thus determine this is a videoconference interruption in embodiments herein. In other embodiments, this UMD software module determination of movement may be used as an input into a trained intelligent videoframe privacy monitoring management system neural network for determination of further context of detected background motion in some embodiments.

In an additional embodiment, the distance data from the proximity sensor, such as the TOF sensor may be used as inputs into a trained intelligent videoframe privacy monitoring management system neural network when one is used. These inputs may be used to assist in either determination of videoconference interruptions, or for already determined videoconference interruptions to determine a further determination of additional context of such videoconference interruption by the trained neural network. For example, the neural network may determine whether the detected person is the user, who else or what else (i.e., a pet) is detected at certain distances or the like through neural network application for facial/object recognition. Additionally, the neural network determine a context of a video conference session as formal or casual via image or object recognition neural network application and other inputs such as contextual meeting metrics about identification of videoconference session participants. These inputs may be used in identifying whether or what optimized videoframe privacy adjustments are to be made.

The values gathered at block 810 may further include MMCA meeting metrics, including context meeting metrics, as described in various embodiments herein. The values gathered at block 810 in an embodiment may include meeting metrics recorded by the MMCA host server, or agents thereof operating at each of the participating information handling systems. For example, in an embodiment described with reference to FIG. 6, the MMCA host server 653 may record meeting metrics for the user videoconference session joined by the plurality of information handling systems at block 802. The MMCA meeting metrics may include inputs that identify contextual information about invited participants to a videoconference, location of the information handling system, or other contextual factors about the formality or casual context of the user videoconference sessions. Further examples of such meeting contextual metrics may include invited participant email, invitation context or title, shared collaboration materials, locations of participants, or other videoconference session context factors in an example embodiment. For example, emails or titles of videoconference participants or locations may indicate whether a videoconference is populated by business associates or family and friends. In still other examples, contextual meeting metrics may be gathered by the MMCA host server 653, and may describe the number of users, whether or which users are screensharing, which users are using virtual backgrounds, which users are muted, and which participants are hosting, among other descriptions of participation among a plurality of users in a single videoconference session. These metrics may include an identification of all information handling systems (e.g., 601 and 602) participating in the current videoconference user videoconference session (e.g., 601 or 602). The gathered input data described above may be input into the trained intelligent videoframe privacy monitoring management system neural network.

Additional inputs may include indication of which AV processing instruction modules that may be active such as the application of different types of virtual backgrounds or blurred backgrounds during the videoconference session. Other active AV processing instruction modules may be detected and gathered as inputs to the trained neural network (e.g., eye contact correction, user framing, zoom and face normalizer, etc.), and may include types of different algorithms used for various AV processing instruction modules (e.g., compression, boundary detection, etc.) and the like applied to post-processing the videoframes captured including an image of a user.

In yet another embodiment current media capture settings, current AV processing instruction modules and setting, current offload settings, and the hardware performance metrics and meeting metrics for the MMCA resulting from application of these settings may be gathered inputs. Some or all of the gathered input data described above may be input into the trained intelligent videoframe privacy monitoring management system neural network for embodiments where a neural network is implemented.

At block 812, the intelligent videoframe privacy monitoring system may determine from proximity sensor distance data and by processing the UPD software module or the UMD software module that a videoconference interruption event has occurred. For example, proximity sensor distance data of an area scanned in front of a video camera may indicate a person or object near the video camera in one portion of the videoframe relative to proximity sensor distance data of background portions of the videoframe via execution of the UPD software module. This difference may be used to determine the presence or absence of a user in some embodiments. In other embodiments, a neural network may implement facial recognition to identify the user in some embodiments. In another example, the proximity sensor distance data may indicate multiple persons at closer distances than the proximity sensor distance data for background portions of the videoframe via execution of the UPD software module. These differences may be used to determine that plural faces appear in the videoframe. In an embodiment, the UPD software module may determine the location and number of multiple persons, heads, and thus, faces in the scanned area in front of the video camera that appears in the videoframe.

In yet other embodiments, the UMD software module may operate with multiple UPD determinations of proximity sensor distance data across a scanned area in front of a video camera for a videoframe and plural consecutive videoframes. The UMD software module may determine changes in distance levels at various portions of the persons or objects detected in the scanned area in front of the video camera and appearing in the videoframe. In this way, unusual movement in the scanned area and in the videoframe may be determined. Thus, the intelligent videoframe privacy monitoring system may determine background motion. With this level of information identifying videoconference interruptions such as a user's absence, plural faces, or background motion, the intelligent videoframe privacy monitoring system may proceed to blocks 814 and 816 to determine what optimized videoframe privacy adjustments to make, if any, in an optional embodiment. In other embodiments, the intelligent videoframe privacy monitoring system may utilize a trained neural network to obtain additional context on the videoconference session, implement facial recognition, or for other assessment as in block 814.

In an embodiment having a neural network used with the intelligent videoframe privacy monitoring management system at block 814, the user's information handling system may transmit captured videoframes from before or during the current videoconference session to the trained intelligent videoframe privacy monitoring management system neural network. Additionally, other inputs as described above in block 810 may be transmitted to the trained neural network.

At block 814, the intelligent videoframe privacy monitoring management system may determine from the sensor proximity data and UPD software module and UMD software module as described above, whether a videoconference interruption event is detected according to embodiments described herein. Additionally, at block 814, the intelligent videoframe privacy monitoring management system may apply one or more optimized videoframe privacy adjustments as described herein. In some embodiments, the intelligent videoframe privacy monitoring management system may utilize a neural network to further assist in determination of a videoconference interruption event or additional context related to the videoconference session and the videoconference interruption.

In embodiments where the intelligent videoframe privacy monitoring management system uses a trained neural network, the processor may execute instructions of the trained intelligent videoframe privacy monitoring management system neural network with the inputs gathered above. As described, the trained intelligent videoframe privacy monitoring management system may be convolutional neural network or other neural network suitable for analysis of image of object recognition analysis in an embodiment. As also described with respect several embodiments herein, the trained intelligent videoframe privacy monitoring management system neural network is trained with previous reference images of a user and may in particular be trained with respect to user image components such as face, hair, skin, eyes and other aspects for which the trained neural network may analyze the input captured videoframes. For example, the trained intelligent videoframe privacy monitoring management system neural network may be trained to recognize a user, other persons or objects. In another embodiment, the trained neural network may also be trained in determining from inputs such as videoframes, image recognition, contextual meeting metrics, location, or other inputs, the formal or casual context of the videoconference session and the response for a detected videoconference interruption.

Per embodiments describing the trained neural network, the outputs generated may include identification or context for one or more videoconference interruptions such as detected absence or presence of a user, detected plural faces, or detected background motion. The outputs of the trained neural network may further provide image recognition of the user, other persons or objects, and of background elements which may be correlated with whether to apply optimized videoframe privacy adjustments or what type to apply in an example embodiment. In some embodiments, monitoring for videoconference interruptions may be assisted by one or more AV processing instruction modules such as the UPD software module or the UMD software module. In another example embodiment, the trained neural network outputs may include identification of the formal or casual status of the videoconference session to determine whether to apply optimized videoframe privacy adjustments or what type to apply. In yet another example embodiment, recognition of the identity of one or more persons or objects within the videoframe may determine whether to end the application of the optimized videoframe privacy adjustments and return the videoconference session to previous settings for captured videoframes and audio settings. In one embodiment, the neural network output may include determining whether application of optimized videoframe privacy adjustment may cause interference with currently applied AV processing instruction modules applying post-processing on captured videoframes. For example, apply a blur to videoframes already being processed may conflict with an instruction to apply a virtual background and may be avoided.

Flow may proceed to block 816 where the intelligent videoframe privacy monitoring management system may determine whether any videoconference interruptions have been detected in one or more captured videoframes. As described, the detection of the videoconference interruption may occur with just the proximity sensor data as processed by the UPD software module or the UMD software module in an embodiment. In other embodiments, such data may be used as inputs into the trained intelligent videoframe privacy monitoring management system neural network may determine the videoframe interruptions or additional context about those videoframe interruptions. If at least one videoframe interruption has been identified for which the intelligent videoframe privacy monitoring management system is conducting intelligent monitoring, then flow may proceed to block 818 for the intelligent videoframe privacy monitoring management system to apply an optimized videoframe privacy adjustment to the captured videoframes. In an example embodiment, the types of videoconference interruptions for intelligent videoframe privacy monitoring may have been selected by a user via a user interface as described. If no videoconference interruptions have been identified for which the intelligent videoframe privacy monitoring management system is conducting intelligent monitoring, then flow may proceed to block 820 to conduct any AV processing of captured videoframes as well as other AV data that may be otherwise applied to conduct a videoconference session via the MMCA.

At block 818, in an embodiment in which it has been determined that a videoconference interruption has been detected, the intelligent videoframe privacy monitoring management system may apply the one or more corresponding optimized videoframe privacy adjustments for a response. In one embodiment, a trained neural network may not be utilized by the intelligent videoframe privacy monitoring management system and settings for types of optimized videoframe privacy adjustments to be applied may be executed via the video processing engine. Example embodiments of optimized videoframe privacy adjustments in response to a detected videoconference interruption may include replacing captured videoframes with a stock photo, applying a virtual background or blur to a background without a user present, applying a virtual background or blur to a background around the user to mask the background, applying a blur to additional detected faces but not to the closest face or the identified user's face, or muting a user's microphone.

In an example embodiment, if a user is detected as absent from the videoframes by the TOF sensor and UMD software module, then the intelligent videoframe privacy monitoring management system may determine from settings or from neural network determination that a videoframe privacy alteration may be made to the videoframes. In one example embodiment for a detected videoconference interruption identified as a user detected as absent before the camera system, the intelligent videoframe privacy monitoring management system may apply one or more optimized videoframe privacy adjustments to the videoframes or audio capture. For example, if a user is absent, an optimized videoframe privacy adjustment may include muting the microphone so no sound is captured while the user has stepped away.

In another example, the intelligent videoframe privacy monitoring management system may determine from settings or from neural network determination that a virtual background is to be invoked by an AV processing instruction module and applied to the captured videoframes as an optimized videoframe privacy adjustments such that, with the user absent the entire videoframe will present the virtual background. The optimized videoframe privacy adjustment may apply a background blur to be invoked with an AV processing instruction module and applied to the captured videoframes such that the entire background is blurred for privacy while a user has stepped away in yet another embodiment. These optimized videoframe privacy adjustments may depend on use of a boundary detection module in some embodiments for when a user returns. In other embodiments, these optimized videoframe privacy adjustments may depend on contextual determination that a virtual background or background blur is not already active. In yet another embodiment of a user being detected as absent, the optimized videoframe privacy adjustments may apply providing a stock image such as a still photo of a user, a company image, or other image to replace transmission of captured videoframes while the user is detected as absent. In a further embodiment, the optimized videoframe privacy adjustments may simply turn off the camera.

In a further example embodiment, additional context for detected videoconference interruption may determine particulars of a type of virtual background or stock image used as an optimized videoframe privacy adjustment. For example, if a contextual determination is that a videoconference session is formal or professional, the selection of stock image or virtual background may be something professional such as a company logo or a professional photo of the user in some embodiments. If a contextual determination is that a videoconference session is casual, the selection of stock image or virtual background may be something more casual as well. For example, a fanciful image of a favorite sports team, vacation place, or a family photo of the user may be used in other embodiments. In some contextual determinations of a casual videoconference session, no optimized videoframe privacy adjustment may be implemented at all.

In another example embodiment, if plural faces or an additional object (e.g., a pet) is detected in the videoframes by the TOF sensor and UMD software module, then the intelligent videoframe privacy monitoring management system may determine from settings or from neural network determination that a videoframe privacy alteration may be made to the videoframes. In another example embodiment for a detected videoconference interruption identified as detection of plural faces or an additional object, such as a pet, detected before the camera system, the intelligent videoframe privacy monitoring management system may apply one or more optimized videoframe privacy adjustments to the videoframes or audio capture. For example, if plural faces or a pet appears as detected during a videoconference session, an optimized videoframe privacy adjustment may include muting the microphone so no sound is captured while the user company in front of the camera. The intelligent videoframe privacy monitoring management system may determine from settings or from neural network determination that a virtual background is to be invoked by an AV processing instruction module and applied around the image of the user in the captured videoframes as an optimized videoframe privacy adjustment such that, the additional plural faces or the pet are masked by the virtual background in an embodiment. In another embodiment, the optimized videoframe privacy adjustment may apply a background blur to be invoked with an AV processing instruction module and applied and applied around the image of the user in the captured videoframes such that the additional plural faces or pet in the background are blurred for privacy. These optimized videoframe privacy adjustments may depend on use of a boundary detection module in some embodiments. In other embodiments, the intelligent videoframe privacy monitoring management system may determine that the closest person's face in the image frame is the user or may use facial recognition among the plural faces or object to apply virtual background or background blur around the user's face in various embodiments. In other embodiments, these optimized videoframe privacy adjustments may depend on contextual determination that a virtual background or background blur is not already active. In yet another embodiment, the optimized videoframe privacy adjustments may apply providing a stock image such as a still photo of a user, a company image, or other image to replace transmission of captured videoframes while the user is detected as absent. In a further embodiment, the optimized videoframe privacy adjustments may simply turn off the camera.

In a further example embodiment, additional context for detected videoconference interruption may determine whether a virtual background, blurred background or stock image is applied at all depending on formal or casual assessment of the videoconference session. Alternatively, particulars of a type of virtual background or stock image used as an optimized videoframe privacy adjustment may depend on context of a formal videoconference or casual videoconference. In some contextual determinations of a casual videoconference session, no optimized videoframe privacy adjustment may be applied at all since multiple faces may be desired for a family videoconference or for a virtual happy hour in some embodiments. In another example, if a contextual determination is that a videoconference session is formal or professional, the selection of stock image or virtual background may be something professional such as a company logo or a professional photo of the user in some embodiments. If a contextual determination is that a videoconference session is casual, the selection of stock image or virtual background may be something more casual as well such as fanciful image of a favorite sports team, cocktail, or a family photo of the user in other embodiments.

In yet another example embodiment, if background motion is detected in the videoframes by the TOF sensor and UMD software module, then the intelligent videoframe privacy monitoring management system may determine from settings or from neural network determination that a videoframe privacy alteration may be made to the videoframes. Where a detected videoconference interruption is identified as detected background motion in front of the camera system, the intelligent videoframe privacy monitoring management system may apply one or more optimized videoframe privacy adjustments to the videoframes or audio capture. For example, background motion is detected, an optimized videoframe privacy adjustment may include muting the microphone so no sound is captured while there is activity in the user's background. The intelligent videoframe privacy monitoring management system may determine from settings or from neural network determination that a virtual background is to be invoked by an AV processing instruction module and applied to the captured videoframes as an optimized videoframe privacy adjustments such that the background will be masked by the virtual background in an embodiment. In another embodiment, the optimized videoframe privacy adjustment may apply a background blur to be invoked with an AV processing instruction module and applied to the captured videoframes such that the background is blurred for privacy while background motion is detected. These optimized videoframe privacy adjustments may depend on use of a boundary detection module in some embodiments. In other embodiments, these optimized videoframe privacy adjustments may depend on contextual determination that a virtual background or background blur is not already active. In yet another embodiment of detected background motion, the optimized videoframe privacy adjustments may apply providing a stock image such as a still photo of a user, a company image, or other image to replace transmission of captured videoframes while there is background motion detected. In a further embodiment, the optimized videoframe privacy adjustments may simply turn off the camera.

In a further example embodiment, additional context for detected videoconference interruption may determine particulars of a type of virtual background or stock image used as an optimized videoframe privacy adjustment. For example, if a contextual determination is that a videoconference session is formal or professional, the selection of stock image or virtual background may be something professional such as a company logo or a professional photo of the user in some embodiments. If a contextual determination is that a videoconference session is casual, the selection of stock image or virtual background may be something more casual as well such as fanciful image of a favorite sports team, vacation place, or a family photo of the user in other embodiments. In some contextual determinations of a casual videoconference session, that may determine that no optimized videoframe privacy adjustment is needed at all.

The intelligent videoframe privacy monitoring management system may apply optimized videoframe privacy adjustments and recurrently monitor for detection of videoconference interruptions until such interruptions are no longer detected in an embodiment. Upon detection that the videoconference interruptions has ended, the intelligent videoframe privacy monitoring management system may terminate the optimized videoframe privacy adjustments and return the audio and videoframe capture settings to their previous state before the detected videoconference interruption.

In an example embodiment for a detected videoconference interruption identified as a user detected as absent before the camera system, the return of the user may cause the intelligent videoframe privacy monitoring management system to terminate the optimized videoframe privacy adjustments to the videoframes or audio capture. In a further example embodiment, additional context for the detected change in detected videoconference interruption may apply facial recognition to the returning person to determine it is the user/participant in the videoconference session before terminating the optimized videoframe privacy adjustments to the videoframes or audio capture.

In another example embodiment for a detected videoconference interruption identified as plural faces or an additional object such as a pet detected before the camera system, the exit or elimination of the additional faces or additional object may cause the intelligent videoframe privacy monitoring management system to terminate the optimized videoframe privacy adjustments to the videoframes or audio capture. In a further example embodiment, additional context for the detected change in detected videoconference interruption may apply facial recognition to assess whether the remaining person detected before the camera system is the user/participant in the videoconference session before terminating the optimized videoframe privacy adjustments to the videoframes or audio capture.

In another example embodiment for a detected videoconference interruption identified as detected background motion in front of the camera system, the end of the background motion may cause the intelligent videoframe privacy monitoring management system to terminate the optimized videoframe privacy adjustments to the videoframes or audio capture. In a further example embodiment, additional context for the detected change in detected videoconference interruption may apply facial recognition to assess whether the remaining person is the user/participant in the videoconference session before terminating the optimized videoframe privacy adjustments to the videoframes or audio capture.

Proceeding to block 820, the MMCA may apply any additional AV processing instructions modules to the captured videoframes or audio data to conduct the videoconference session. For example, face framing, image shading compensation, virtual background or background blur may be invoked by the user of the MMCA for the videoconference session. Additionally, the MMCA may utilize AV processing instruction modules such as super resolution algorithms, boundary detection algorithms, face framing algorithms, zoom or face sizing algorithms, color or shading adjustment algorithms or others to process the videoframes in preparation for transmission in the videoconference session. Additionally, encoding AV processing instruction modules and compression AV processing instruction modules may be used for encoding and compressing the videoframes for transmission via the MMCA in the videoconference session according to various algorithms of embodiments of the present disclosure or understood by those of skill.

At block 822, the participating information handling systems may process captured videoframes apply any optimized videoframe privacy adjustments, where applicable, as determined by the intelligent videoframe privacy monitoring management system according to embodiments herein. For example, the intelligent videoframe privacy monitoring management system may apply processing to videoframes or audio data to apply videoframe privacy alterations to captured videoframes or to mute a user's microphone in response to the identification of a videoconference interruption. Application of an optimized videoframe privacy adjustment may also depend on a determined formal or casual context of the videoconference session or identification of a user or other persons or objects in the videoframe, as well as other AV processing instruction modules operating in various embodiments. These aspects of applying the optimized videoframe privacy adjustment may be determined by the intelligent videoframe privacy monitoring management system in some embodiments, or with the assistance of a trained neural network in some embodiments. Then the user information handling system may encode and compress the videoframes and transmit encoded and compressed videoframes and audio data via the MMCA for purposes of conducting the videoconference session. In such a way, the intelligent videoframe privacy monitoring management system may direct the optimized videoframe privacy adjustments applied to the transmitted video frames to alter the captured videoframes or adjust/mute a microphone to benefit the user from a potentially embarrassing or otherwise undesirable videoconference interruption according to various embodiments herein.

At block 824, the MMCA or the intelligent videoframe privacy monitoring management system may receive an indication that the videoconference session has ended. If not, the flow may proceed back to block 806 to continue capturing more proximity sensor data, more video frames, or other inputs, and continue to intelligently monitor for videoframe privacy according to the method steps described for FIG. 8 above. If the videoconference is ended, the method of intelligently monitoring user appearance during videoconference sessions of the MMCA on the user's information handling system may then end.

The blocks of the flow diagrams of FIGS. 7 and 8, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an intelligent videoframe privacy monitoring management system comprising:
    a processor configured to execute code instructions of a multimedia multi-user collaboration application to join a videoconference session with a remotely located computing device;
    a display screen, a speaker, a video camera, and a microphone;
    the video camera system configured to capture videoframes of a user and background in the videoconference session;
    the processor to execute code instructions of a user presence detection module with sensor data, including the video camera system, time of flight (TOF) sensor, or a microphone, to detect distance data for the user or objects in front of the video camera system;
    the processor to input videoframes and the detected distance data from the user presence detection module of the user or the objects, to a trained neural network of the intelligent videoframe privacy monitoring management system to use the detected proximity sensor distance data to identify the presence or absence of the user and the videoframe data to identify the user;
    the processor to execute code instructions the intelligent videoframe privacy monitoring management system to output determination of the user's presence or absence, to identify an image of the user as a videoconference participant, and then to generate an optimized videoframe privacy adjustment correlated to the user's absence, where the optimized videoframe privacy adjustment includes generating AV processing instruction adjustment to apply a privacy alteration to captured videoframes when the user is detected as absent even when another person not identified as the user is present; and
    a network interface device configured to transmit a processed, encoded media sample, including the captured videoframes with any applied privacy alteration to a remotely located computing device participating in the videoconference session.

2. The information handling system of claim 1 further comprising:
    the (TOF) sensor device to detect distance data of the user or the background from the video camera system.

3. The information handling system of claim 1, wherein the optimized videoframe privacy adjustment includes replacing the captured videoframes with a stock photo as the AV processing instruction adjustment for transmission when the user is detected as absent.

4. The information handling system of claim 1, wherein the optimized videoframe privacy adjustments includes executing a virtual background AV processing instruction module to apply a virtual background to the captured videoframes as the AV processing instruction adjustment when the user is detected as absent.

5. The information handling system of claim 1, wherein the optimized videoframe privacy adjustments includes executing a blurring AV processing instruction module to blur the captured videoframes as the AV processing instruction adjustment when the user is detected as absent.

6. The information handling system of claim 1 further comprising:
    the processor to execute code instructions for the trained neural network to detect a return presence of the user in front of the video camera system after the user is detected as absent via detected distance data; and
    the processor to end the applied optimized videoframe privacy adjustment to the captured video frames for transmission.

7. The information handling system of claim 1 further comprising:
    the processor to execute code instructions of the intelligent videoframe privacy monitoring management system to output a determination of plural detected faces or background movement in front of the video camera system and to generate an optimized videoframe privacy adjustment, where the optimized videoframe privacy adjustment includes generating AV processing instruction adjustment to apply a privacy alteration to captured videoframes when plural detected faces or background movement is detected.

8. The information handling system of claim 1 further comprising:
    the processor to execute code instructions to identify a single face and no background movement behind the user; and
    the processor to end the applied optimized videoframe privacy adjustment to the captured video frames for transmission.

9. The information handling system of claim 1 further comprising:
    the processor to execute code instructions of a trained neural network of the intelligent videoframe privacy monitoring management system to output determination of a user's presence or absence and identity recognition of the user's face, and to generate an optimized videoframe privacy adjustment correlated to the user's absence or presence, the identity recognition of the user's face, where the optimized videoframe privacy adjustment includes generating AV processing instruction adjustment to apply a privacy alteration to captured videoframes when the user is detected as absent or end the privacy alteration when the user is identified and detected as present.

10. A method for intelligently managing a user's appearance in a collaboration videoconference session for an information handling system, comprising:
    executing code instructions of a multimedia multi-user collaboration application, via a processor, to join a videoconference session with a remotely located computing device;

capturing videoframe of a user and background, via a video camera, in the videoconference session;

detecting, with a proximity sensor, distance data for the user and objects in front of the video camera;

inputting videoframe data and the detected proximity sensor distance data of the user and the objects to the intelligent videoframe privacy monitoring management system to use the detected proximity sensor distance data to identify the presence or absence of the user and the videoframe data to identify the user;

executing code instructions of the intelligent videoframe privacy monitoring management system to output determination of the user's presence or absence, to identify an image of the user as a videoconference participant, and to generate an optimized videoframe privacy adjustment correlated to the user's absence based on the distance data even when another person not identified as the user is present, where the optimized videoframe privacy adjustment includes generating AV processing instruction adjustment to apply a privacy alteration to captured videoframes when the user is detected as absent even when the another person is present before the video camera; and transmitting, via a network interface device, a processed, encoded media sample, including the captured videoframes with any applied privacy alteration, to a remotely located computing device participating in the videoconference session.

11. The method of claim 10 further comprising:
replacing the captured videoframes to be transmitted with a stock user image as the optimized videoframe privacy adjustment when the user is detected as absent.

12. The method of claim 10 further comprising:
ending the optimized videoframe privacy adjustment returning to the previous AV processing settings for the captured videoframes to be transmitted when a trained neural network of the intelligent videoframe privacy monitoring management system outputs a determination of the user's presence.

13. The method of claim 10 further comprising:
executing a virtual background AV processing instruction module to apply a virtual background to the captured videoframes to be transmitted as the optimized videoframe privacy adjustment when the user is detected as absent.

14. The method of claim 10 further comprising:
executing code instructions of the intelligent videoframe privacy monitoring management system to output determination of plural detected faces in front of the video camera system and to generate an optimized videoframe privacy adjustment, where the optimized videoframe privacy adjustment includes generating AV processing instruction adjustment to apply a privacy alteration to captured videoframes when the plural detected faces are detected.

15. The method of claim 10 further comprising:
executing code instructions of the intelligent videoframe privacy monitoring management system to output determination of background movement in front of the video camera system and to generate an optimized videoframe privacy adjustment, where the optimized videoframe privacy adjustment includes generating AV processing instruction adjustment to apply a privacy alteration to captured videoframes when the background movement is detected.

16. An information handling system executing an intelligent videoframe privacy monitoring management system comprising:
a processor to execute code instructions of a multimedia multi-user collaboration application to join a videoconference session with a remotely located computing device;
a display screen, a speaker, a video camera, and a microphone;
the video camera system configured to capture videoframes of a user and background in the videoconference session;
the processor to execute code instructions of a user presence detection module with sensor data, including from the video camera system, time of flight (TOF) sensor, or a microphone, to detect distance data for the user or objects in front of the video camera system;
the processor to input videoframes and the detected distance data from the user presence detection module of the user or the objects to the intelligent videoframe privacy monitoring management system to use the detected proximity sensor distance data to identify the presence or absence of the user and the videoframe data to identify the user;
the processor to execute code instructions of the intelligent videoframe privacy monitoring management system to output a determination of plural detected faces or background movement before the video camera system and to identify an image of the user as a videoconference participant among the plural detected faces or background movement, and then to generate an optimized videoframe privacy adjustment, where the optimized videoframe privacy adjustment includes generating AV processing instruction adjustment to apply a privacy alteration to captured videoframes when plural detected faces or background movement is detected; and
a network interface device configured to transmit a processed, encoded media sample, including the captured videoframes with any applied privacy alteration to a remotely located computing device participating in the videoconference session.

17. The information handling system of claim 16 further comprising:
(the TOF) sensor device to detect distance data of the user or the background from the video camera system.

18. The information handling system of claim 16, wherein the optimized videoframe privacy adjustments includes executing a blurring AV processing instruction module to detect the closest face of the plural detected faces and to apply blur other plural detected faces but not the closest face in the captured videoframes as the AV processing instruction adjustment when plural detected faces are detected.

19. The information handling system of claim 16, wherein the optimized videoframe privacy adjustments includes executing a blurring AV processing instruction module to detect the closest face of the plural detected faces and to apply blur around the closest face of the plural detected faces in the captured videoframes as the AV processing instruction adjustment when plural detected faces are detected.

20. The information handling system of claim 16, wherein the optimized videoframe privacy adjustments includes executing a virtual background AV processing instruction module to apply a virtual background to the captured videoframes as the AV processing instruction adjustment when background movement behind the user is detected.

* * * * *